US012675059B2

(12) United States Patent
Yoshihara et al.

(10) Patent No.: US 12,675,059 B2
(45) Date of Patent: Jul. 7, 2026

(54) TONER SET, ELECTROSTATIC CHARGE IMAGE DEVELOPER SET, TONER CARTRIDGE SET, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Kotaro Yoshihara, Kanagawa (JP); Asafumi Fujita, Kanagawa (JP); Teppei Yawada, Kanagawa (JP); Tomoaki Tanaka, Kanagawa (JP); Tsuyoshi Murakami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 723 days.

(21) Appl. No.: 18/156,415

(22) Filed: Jan. 19, 2023

(65) Prior Publication Data

US 2024/0094652 A1 Mar. 21, 2024

(30) Foreign Application Priority Data

Sep. 12, 2022 (JP) ................................. 2022-144898

(51) Int. Cl.
*G03G 9/093* (2006.01)
*G03G 9/08* (2006.01)

(52) U.S. Cl.
CPC ....... *G03G 9/09307* (2013.01); *G03G 9/0819* (2013.01); *G03G 2215/0122* (2013.01); *G03G 2221/0005* (2013.01)

(58) Field of Classification Search
CPC ............ G03G 9/09307; G03G 9/0819; G03G 2215/0122; G03G 2221/0005
See application file for complete search history.

(56) References Cited

U.S. PATENT DOCUMENTS 9,182,689 B2 11/2015 Kamiwaki et al.
2005/0136352 A1* 6/2005 Vandewinckel ... G03G 9/09791 430/108.7

(Continued)

FOREIGN PATENT DOCUMENTS

JP 2000258950 9/2000
JP 2000267338 9/2000

(Continued)

OTHER PUBLICATIONS

English machine translation of the description of JP-2016038448-A (Year: 2016).*

(Continued)

*Primary Examiner* — Mark F. Huff
*Assistant Examiner* — Boone Alexander Evans
(74) *Attorney, Agent, or Firm* — JCIPRNET

(57) ABSTRACT

A toner set has a white toner and a color toner, in which in a case where Cw [mg/L] represents an amount of a cation on a surface of the white toner, measured by ion chromatography, and Cc [mg/L] represents an amount of a cation on a surface of the color toner, measured by ion chromatography, the toner set satisfies Conditions (1) and (2).

$$0.3\ \text{mg/L} \le Cc \le 1.2\ \text{mg/L} \quad (1)$$

$$(Cw/Cc) \le 0.8 \quad (2)$$

17 Claims, 2 Drawing Sheets

(56) References Cited

U.S. PATENT DOCUMENTS

| | | | | |
|---|---|---|---|---|
| 2011/0052882 | A1* | 3/2011 | Gong | G03G 9/0812 430/108.3 |
| 2017/0090319 | A1* | 3/2017 | Kamiwaki | G03G 9/08755 |
| 2018/0164709 | A1 | 6/2018 | Taguchi et al. | |

FOREIGN PATENT DOCUMENTS

| | | | |
|---|---|---|---|
| JP | 2006154641 | | 6/2006 |
| JP | 2010097101 | | 4/2010 |
| JP | 2012177763 | | 9/2012 |
| JP | 2016038448 | | 3/2016 |
| JP | 2016038448 | A * | 3/2016 |
| JP | 2020129043 | | 8/2020 |

OTHER PUBLICATIONS

"Search Report of Europe Counterpart Application", issued on Jan. 29, 2024, pp. 1-7.

* cited by examiner

TONER SET, ELECTROSTATIC CHARGE IMAGE DEVELOPER SET, TONER CARTRIDGE SET, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-144898 filed Sep. 12, 2022.

BACKGROUND

(i) Technical Field

The present invention relates to a toner set, an electrostatic charge image developer set, a toner cartridge set, a process cartridge, an image forming apparatus, and an image forming method.

(ii) Related Art

For example, JP2020-129043A discloses an image forming method including a step of forming an image by collectively transferring and fixing a white toner and a color toner to a recording medium, in which in a case where tan $\delta w_{100k}$ represents a dielectric loss tangent of the white toner at 100 kHz in an environment of 20° C. and 50% RH and tan $\delta c_{100k}$ represents a dielectric loss tangent of the color toner at 100 kHz in an environment of 20° C. and 50% RH, Formula (1) tan $\delta w_{100k}$<tan $\delta c_{100k}$ is satisfied.

SUMMARY

Aspects of non-limiting embodiments of the present disclosure relate to a toner set that is capable of further suppressing streaks occurring in an image in a case where the toner set is used for continuous printing at a high temperature and a high humidity, left to stand, and then reused for printing, compared to a toner set that has a white toner and a color toner and has Cc less than 0.3 mg/L or more than 1.2 mg/L or satisfies (Cw/Cc)>0.8 where Cw [mg/L] represents an amount of a cation on a surface of the white toner, measured by ion chromatography, and Cc [mg/L] represents an amount of a cation on a surface of the color toner, measured by ion chromatography.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for achieving the above object include the following aspects.

According to an aspect of the present disclosure, there is provided a toner set having a white toner, and a color toner, in which in a case where Cw [mg/L] represents an amount of a cation on a surface of the white toner, measured by ion chromatography, and Cc [mg/L] represents an amount of a cation on a surface of the color toner, measured by ion chromatography, the toner set satisfies Conditions (1) and (2).

$$0.3\ \text{mg/L} \leq Cc \leq 1.2\ \text{mg/L} \quad (1)$$

$$(Cw/Cc) \leq 0.8 \quad (2)$$

BRIEF DESCRIPTION OF THE DRAWINGS

Exemplary embodiment(s) of the present invention will be described in detail based on the following figures, wherein.

DETAILED DESCRIPTION

Figure 1:
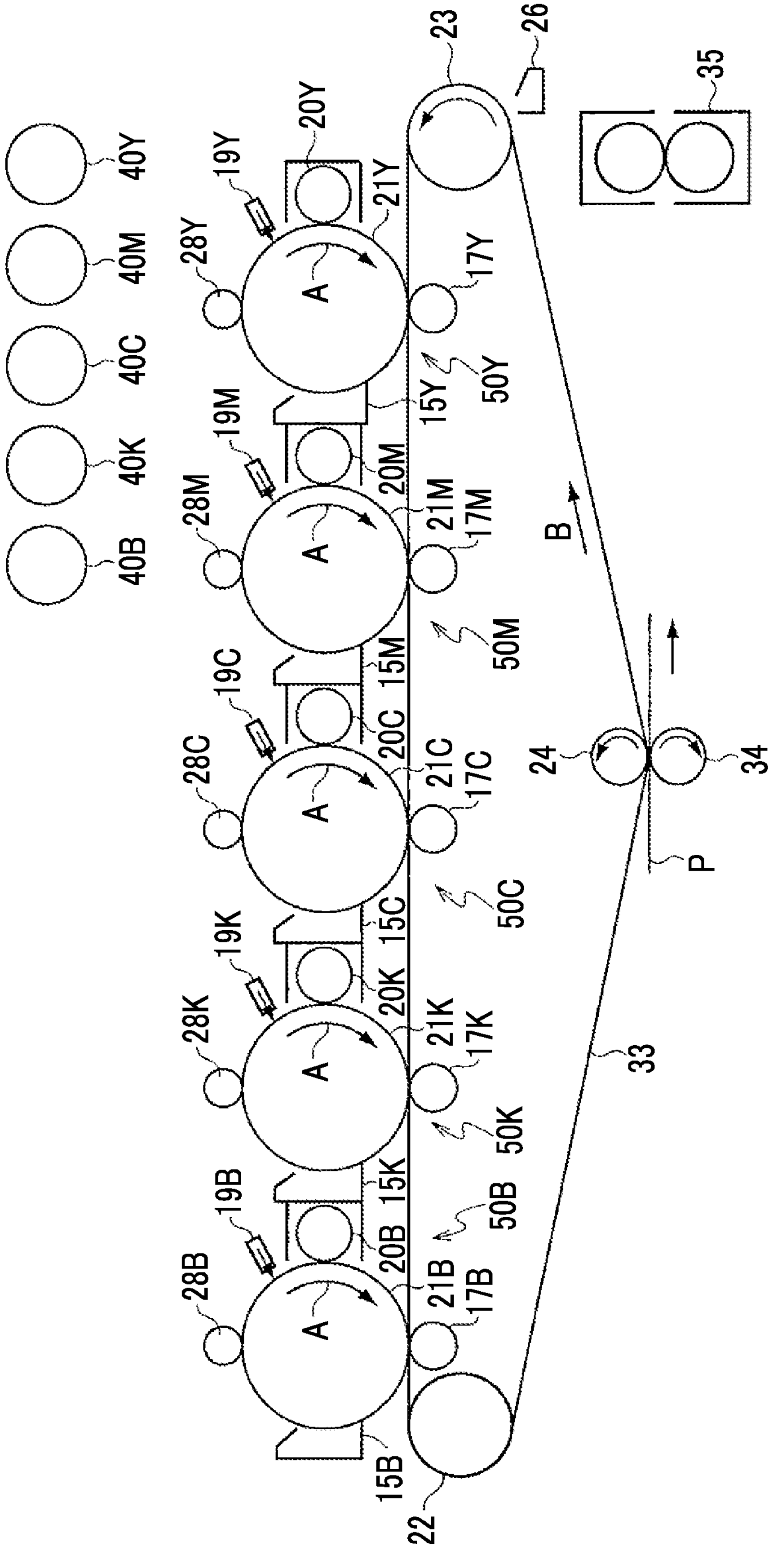
FIG. 1 is a view schematically showing the configuration of an example of an image forming apparatus according to the present exemplary embodiment.

The exemplary embodiments as an example of the present invention will be specifically described below.

Regarding the ranges of numerical values described in stages, the upper limit or lower limit of a certain range of numerical values may be replaced with the upper limit or lower limit of another range of numerical values described in stages.

Furthermore, the upper limit or lower limit described regarding a range of numerical values may be replaced with values described in examples.

Regarding the amount of each component in a composition, in a case where there are two or more substances corresponding to each component in the composition, unless otherwise specified, the amount of each component means the total amount of two or more substances present in the composition.

The term "step" includes not only an independent step but a step which is not clearly distinguished from other steps as long as the intended goal of the step is achieved.

Toner Set

The toner set according to the present exemplary embodiment has a white toner and a color toner, in which in a case where Cw [mg/L] represents an amount of a cation on a surface of the white toner, measured by ion chromatography, and Cc [mg/L] represents an amount of a cation on a surface of the color toner, measured by ion chromatography, the toner set satisfies Conditions (1) and (2).

$$0.3\ \text{mg/L} \leq Cc \leq 1.2\ \text{mg/L} \quad (1)$$

$$(Cw/Cc) \leq 0.8 \quad (2)$$

In order to increase a degree of concealment of the image to be formed, a white toner has a high content of white pigment such as titanium oxide. Accordingly, compared to other color toners (corresponding to the color toner in the present disclosure), the white toner is harder and heavier and more readily facilitates charge injection/leakage due to the titanium oxide on the inside of the toner.

The white toner is frequently used for printing on a recording medium such as a transparent film or black paper. These recording media are thicker than general printing paper and used for printing performed at a lower speed. Therefore, in a case where a white toner image is transferred to these recording media from an intermediate transfer member, sometimes the transfer current is set to a higher level. In this case, it takes long for the recording media to pass through a transfer nip. Accordingly, the white toner (white toner image) is exposed to a high electric field for a long time. As a result, in synergy with the aforementioned characteristics of the white toner, charge injection/leakage is more likely to occur in the white toner, and the charge distribution of the white toner image broadens, which sometimes deteriorates the efficiency of transfer to the recording media from the intermediate transfer member.

Furthermore, during printing on a transparent film, the white toner image is the lowest layer on the intermediate transfer member. Therefore, the white toner image is exposed to an electric field whenever toner images formed of other color toners are transferred to the intermediate transfer member. In this case, the charge distribution of the white toner image also broadens, which sometimes markedly deteriorate the efficiency of transfer to the recording media from the intermediate transfer member.

As described above, in many cases, the white toner is used under conditions where the charge distribution of the white toner image may broaden, such as the conditions where the transfer current is high or the white toner image is exposed very often to the transfer electric field. In a case where the charge distribution of the white toner image broadens, the amount of white toner remaining on the intermediate transfer member increases. Usually, although the residual toners (the white toner and other color toners) are removed (cleaned) by a blade that comes into contact with the surface of the intermediate transfer member, in a case where the proportion of the white toner which has a relatively high hardness and a high specific gravity is high, the white toner having a high hardness gathers at the location close to the tip of the blade, which chips the tip of the blade.

In addition, in a case where the transfer current is increased or the white toner image is exposed very often to the transfer electric field, discharge products (including discharge products having moved to the intermediate transfer member from the image holder and the discharge products occurring in the transfer electric field) are likely to be accumulated on the intermediate transfer member. The discharge products interact with the moisture on the toner surface in the toner image, which enhances the adhesion between the toner image and the intermediate transfer member. Therefore, the removability by the blade deteriorates, and as a result, chipping of the tip of the blade is promoted. In a case where the blade is chipped, the white toner that remains on the intermediate transfer member without being removed by the blade is transferred to a recording medium, and streaks (white streaks) occur in the image.

Particularly, in a case where the white toner is used to continuously perform printing at a high temperature and a high humidity, left to stand, and then reused to perform printing, streaks (white streaks) are likely to occur in an image. The reason is presumed as follows.

By continuous printing, the proportion of the amount of white toner remaining on the intermediate transfer member is increased, and the amount of the generated discharge products is also increased, which enhances the adhesion of the white toner image to the surface of the intermediate transfer member. In a case where the white toner is then left to stand, the adhesion of the white toner image to the intermediate transfer member is further enhanced. Therefore, in a case where the white toner is reused for printing, the white toner that remains on the surface of the intermediate transfer member and firmly adheres to the surface of the intermediate transfer member rushes into and collides with the tip of the blade, and the tip of the blade is chipped. Presumably, as a result, streaks (white streaks) may occur in the image.

The toner set according to the present exemplary embodiment may suppress the occurrence of streaks in an image, in a case where the toner set is used for continuous printing at a high temperature and a high humidity, left to stand, and then reused for printing. Hereinafter, this effect will be also simply described as "suppression of streaks occurring in an image". The following is presumed as the mechanism.

In the toner set according to the present exemplary embodiment, an amount Cw of a cation adhering to the surface of the white toner is set to be smaller than an amount Cc of a cation adhering to the surface of the color toner such that Condition (2) is satisfied. The larger the amount of the cation on the surface of the toner is, the larger the amount of moisture on the surface of the toner tends to be. It is considered that the white toner having a smaller amount of moisture on the surface is less likely to interact with the discharge products and can suppress the enhancement of the adhesion to the surface of the intermediate transfer member.

On the other hand, the amount of the cation on the surface of the color toner is larger than the amount of the cation on the surface of the white toner. It is considered that because the amount of moisture on the color toner is larger than the amount of moisture on the surface of the white toner, the color toner may preferentially interact with the discharge products before the white toner does, which may enhance the adhesion to the surface of the intermediate transfer member. Furthermore, because the surface of the color toner has an amount of a cation satisfying Condition (1) and has a large amount of moisture, the color toner is likely to form loose aggregates. It is considered that the loose aggregates are likely to be scattered in the cleaning portion, and the color toner is likely to be selectively present at the tip portion of the blade.

As a result, the color toner is more likely to come into contact with the tip of the blade than the white toner, which can inhibit the white toner from coming into contact with (colliding with) the tip of the blade. Presumably, as a result, even under the condition where the white toner is used for continuous printing at a high temperature and a high humidity, left to stand, and then reused for printing, the tip of the blade may not be chipped, and the occurrence of streaks (white streaks) in an image may be suppressed.

Examples of the color toner in the toner set according to the present exemplary embodiment include a chromatic color toner such as a yellow toner, a cyan toner, a magenta toner, a black toner, a red toner, a green toner, a blue toner, an orange toner, or a violet toner and an achromatic toner other than a white toner such as a black toner and a gray toner.

The toner set according to the present exemplary embodiment may include only one kind of color toner and one kind of white toner or include two or more kinds of color toners and two or more kinds of white toners.

The toner set according to the present exemplary embodiment may include other toners such as a luminous gold or silver toner and a transparent toner.

Particularly, from the viewpoint of easily forming a full color image, the toner set according to the present exemplary embodiment preferably includes, for example, a yellow toner, a cyan toner, a magenta toner, and a black toner as color toners.

Each Condition

Condition (1)

The toner set according to the present exemplary embodiment satisfies Condition (1).

$$0.3\ \text{mg/L} \leq Cc \leq 1.2\ \text{mg/L} \qquad (1)$$

That is, the amount Cc of the cation on the surface of the color toner is 0.3 mg/L or more and 1.2 mg/L or less. From the viewpoint of suppressing the occurrence of streaks in an image, the amount Cc is, for example, preferably 0.4 mg/L or more and 1.0 mg/L or less, and more preferably 0.5 mg/L or more and 0.8 mg/L or less.

Condition (2)

The toner set according to the present exemplary embodiment satisfies Condition (2), and preferably satisfies, for example, Condition (2').

$$(Cw/Cc) \leq 0.8 \quad (2)$$

$$0.3 \leq (Cw/Cc) \leq 0.8 \quad (2')$$

That is, a value obtained by dividing the amount Cw of the cation on the surface of the white toner by the amount Cc of the cation on the surface of the color toner is (more than 0) 0.8 or less. From the viewpoint of suppressing the occurrence of streaks in an image, the value of Cw/Cc is, and is, for example, preferably 0.3 or more and 0.8 or less, and more preferably 0.2 or more and 0.5 or less.

In a case where the toner set satisfies Condition (2'), the color toner more effectively interacts with the discharge products and easily comes into contact with the tip of the blade. On the other hand, the white toner is less likely to interact with the discharge products and is easily removed from the surface of the intermediate transfer member. As a result, the occurrence of streaks in an image can be further suppressed.

Condition (3)

The toner set according to the present exemplary embodiment preferably satisfies, for example, Condition (3).

$$0.1\ \text{mg/L} \leq Cw \leq 0.6\ \text{mg/L} \quad (3)$$

That is, from the viewpoint of suppressing the occurrence of streaks in an image, the amount Cw of the cation on the surface of the white toner is, for example, preferably 0.1 mg/L or more and 0.6 mg/L or less, more preferably 0.1 mg/L or more and 0.5 mg/L or less, and even more preferably 0.1 mg/L or more and 0.4 mg/L or less.

In a case where the amount of the cation on the surface of the white toner is minutely controlled such that Condition (3) is satisfied, it is possible to further suppress the occurrence of streaks in an image.

Condition (4)

Furthermore, in a case where Bw [$m^2/g$] represents a BET specific surface area of the white toner, and Bc [$m^2/g$] represents a BET specific surface area of the color toner, the toner set according to the present exemplary embodiment preferably satisfied, for example, Condition (4).

$$(Cw/Bw) < (Cc/Bc) \quad (4)$$

That is, from the viewpoint of suppressing the occurrence of streaks in an image, a value obtained by dividing the amount Cw of the cation on the surface of the white toner by the BET specific surface area Bw of the white toner is, for example, preferably smaller than a value obtained by dividing the amount Cc of the cation on the surface of the color toner by the BET specific surface area Bc of the color toner.

The difference (Cc/Bc)−(Cw/Bw) is, for example, preferably 0.1 or more and 0.6 or less, and more preferably 0.2 or more and 0.4 or less.

In a case where the quantitative relationship between cations per unit surface of the toner is controlled in the white toner and the color toner such that Condition (4) is satisfied, the amount of moisture on the surface can be further controlled, which makes it easier to adjust the extent of interaction with the discharge products. In addition, in a case where the amount of the cation per unit surface of the white toner is further reduced, the interaction with the discharge products can be further suppressed. As a result, the occurrence of streaks in an image can be further suppressed.

Condition (5)

In addition, in a case where Dw [μm] represents a volume-average particle size of the white toner, the toner set according to the present exemplary embodiment preferably satisfies, for example, Condition (5).

$$(Cw/Dw) \leq 0.05 \quad (5)$$

That is, From the viewpoint of suppressing the occurrence of streaks in an image, a value obtained by dividing the amount Cw of the cation on the surface of the white toner by the volume-average particle size Dw of the white toner is, for example, preferably 0.05 or less, more preferably 0.01 or more and 0.04 or less, and even more preferably 0.02 or more and 0.03 or less.

In a case where the amount of the cation on the surface of the white toner is minutely controlled such that Condition (5) is satisfied, it is possible to further suppress the occurrence of streaks in an image.

The volume-average particle size Dw of the white toner is, for example, preferably 5.0 μm or more and 12.0 μm or less, and more preferably 6.0 μm or more and 10.0 μm or less.

The volume-average particle size Dc of the color toner is, for example, preferably 4.0 μm or more and 10.0 μm or less, and more preferably 4.0 μm or more and 8.0 μm or less.

Condition (6)

In the toner set according to the present exemplary embodiment, the white toner contains white toner particles and zinc stearate particles as an external additive. In a case where Zw [% by mass] represents an amount of the zinc stearate particles added to the exterior of the white toner particles, and Bw [$m^2/g$] represents a BET specific surface area of the white toner, the toner set preferably satisfies, for example, Condition (6).

$$0.05 \leq (Zw/Bw) \leq 0.15 \quad (6)$$

That is, from the viewpoint of suppressing the occurrence of streaks in an image, a value obtained by dividing the amount Zw of the zinc stearate particles added to the exterior of the white toner particles by the BET specific surface area Bw of the white toner is, for example, preferably 0.05 or more and 0.15 or less, more preferably 0.06 or more and 0.12 or less, and even more preferably 0.06 or more and 0.10 or less.

The amount of moisture on the surface of the white toner having a small amount of the cation on the surface is small. Furthermore, a specific amount of hydrophobic zinc stearate particles are present on the white toner per unit surface of the toner such that Condition (6) is satisfied. Therefore, the interaction with the discharge products can be further suppressed. As a result, the occurrence of streaks in an image can be further suppressed.

The amount Zw of the zinc stearate particles added to the exterior of the white toner particles with respect to the mass of the white toner particles is, for example, preferably 0.02% by mass or more and 0.20% by mass or less, and more preferably 0.05% by mass or more and 0.15% by mass or less.

Condition (7)

The toner set according to the present exemplary embodiment preferably satisfies, for example, Condition (7).

$$0.7\ m^2/g \leq Bw \leq 1.2\ m^2/g \quad (7)$$

That is, from the viewpoint of suppressing the occurrence of streaks in an image, a BET specific surface area Bw of the white toner is, for example, preferably 0.7 $m^2/g$ or more and 1.2 $m^2/g$ or less, more preferably 0.8 $m^2/g$ or more and 1.1 $m^2/g$ or less, and even more preferably 0.8 $m^2/g$ or more and 1.0 $m^2/g$ or less.

Particularly, in a case where Condition (6) is satisfied, for example, it is preferable that Condition (7) be also satisfied.

Condition (8)

In the toner set according to the present exemplary embodiment, the color toner contains color toner particles and zinc stearate particles as an external additive. In a case where Zc [% by mass] represents an amount of the zinc stearate particles added to the exterior of the color toner particles, and Bc [$m^2/g$] represents a BET specific surface area of the color toner, the toner set preferably satisfies, for example, Condition (8).

$$0.20 \leq (Zc/Bc) \leq 0.40 \quad (8)$$

That is, from the viewpoint of suppressing the occurrence of streaks in an image, a value obtained by dividing the amount Zc of the zinc stearate particles added to the exterior of the color toner particles by the BET specific surface area Bc of the color toner is, for example, preferably 0.20 or more and 0.40 or less, more preferably 0.25 or more and 0.35 or less, and even more preferably 0.25 or more and 0.30 or less.

The zinc stearate particles, which are present in a specific amount in the color toner per unit surface of the toner such that Condition (8) is satisfied, act as a binder between toners by a mechanical pressure during transfer, which increases the apparent particle size of the color toner. Therefore, the proportion of the color toner remaining on the surface of the intermediate transfer member without being transferred can be increased, which makes it easier for the color toner and the discharge products to interact with each other. As a result, the occurrence of streaks in an image can be further suppressed.

The amount Zc of the zinc stearate particles added to the exterior of the color toner particles with respect to the mass of the color toner particles is, for example, preferably 0.04% by mass or more and 1.00% by mass or less, and more preferably 0.10% by mass or more and 0.80% by mass or less.

Condition (9)

The toner set according to the present exemplary embodiment preferably satisfies, for example, Condition (9).

$$1.0\ m^2/g \leq Bc \leq 1.3\ m^2/g \quad (9)$$

That is, from the viewpoint of suppressing the occurrence of streaks in an image, a BET specific surface area Bc of the color toner is, for example, preferably 1.0 $m^2/g$ or more and 1.3 $m^2/g$ or less, more preferably 1.25 $m^2/g$ or more and 1.0 $m^2/g$ or less, and even more preferably 1.0 $m^2/g$ or more and 1.20 $m^2/g$ or less.

Particularly, in a case where Condition (8) is satisfied, for example, it is preferable that Condition (9) be also satisfied.

Conditions (10) and (11)

In a case where Sw [percentage of number: pop %] represents an amount of a small-particle-size component having a particle size of 3 μm or less in the white toner, Sc [percentage of number: pop %] represents an amount of a small-particle-size component having a particle size of 3 μm or less in the color toner, SFw represents a circularity of the small-particle-size component in the white toner, and SFc represents a circularity of the small-particle-size component in the color toner, the toner set according to the present exemplary embodiment preferably satisfy, for example, Conditions (10) and (11). Hereinafter, the small-particle-size component having a particle size of 3 μm or less will be also simply called "small-particle-size component".

$$Sw > Sc \quad (10)$$

$$SFw < SFc \quad (11)$$

That is, from the viewpoint of suppressing the occurrence of streaks in an image, the amount Sc of the small-particle-size component in the color toner is, for example, preferably smaller than the amount Sw of the small-particle-size component in the white toner. The difference (Sc−Sw) is, for example, more preferably 5 pop % or more and 30 pop % or less, and even more preferably 10 pop % or more and 20 pop % or less.

Furthermore, from the viewpoint of suppressing the occurrence of streaks in an image, a circularity SFc of the small-particle-size component in the color toner is, for example, preferably higher than a circularity SFw of the small-particle-size component in the white toner. The difference (SFc−SFw) is, for example, more preferably 0.05 or more and 0.20 or less, and even more preferably 0.08 or more and 0.15 or less.

In a case where the amount of the small-sized spherical white toner that is difficult to remove with the blade is smaller than the amount of the color toner such that Conditions (10) and (11) are satisfied, it is possible to prevent the white toner from easily coming into contact with the tip of the blade. As a result, the occurrence of streaks in an image can be further suppressed.

The amount Sw of the small-particle-size component in the white toner is, for example, preferably 5 pop % or more and 35 pop % or less, and more preferably 15 pop % or more and 30 pop % or less. The amount Sc of the small-particle-size component in the color toner is, for example, preferably 0.5 pop % or more and 15.0 pop % or less, and more preferably 0.5 pop % or more and 10 pop % or less.

The circularity SFw of the small-particle-size component in the white toner is, for example, preferably 0.950 or more and equal to 0.970, and more preferably 0.955 or more and equal to 0.965. The circularity SFc of the small-particle-size component in the color toner is, for example, preferably 0.960 or more and less than 1.00, and more preferably 0.965 or more and equal to 0.980.

Various Measurements

Measurement of Amounts Cw and Cc of Cations on Toner Surface

Both the amount Cc of the cation on the surface of the white toner and the amount Cc of the cation on the surface of the color toner are measured by the following method.

First, 0.5 g of a toner as a measurement target is weighed and then added to 100 g of an aqueous medium, followed by stirring. The obtained dispersion is subjected to a dispersion treatment for 20 minutes with an ultrasonic disperser having a temperature adjusted to 30° C. The aqueous medium is deionized water containing 1.0% by mass of polyvinyl alcohol having Mw of 500 or more and 1,000 or less. The dispersion having undergone the dispersion treatment is filtered with a syringe equipped with a filter, and the amount of cations contained in the obtained filtrate is measured by ion chromatography. The amount of cations is quantified using a calibration curve sample having a known concentration.

The apparatus, measurement conditions, and the like used in the ion chromatography are as below.

Apparatus: ion chromatography IC-2001 (manufactured by Tosoh Corporation)

Column: TSK gel IC-Cation, TSK Guard Column IC-C (manufactured by Tosoh Corporation)

Eluent: 2 mmol/l aqueous NaCl solution

Flow rate: 1.2 ml/min

Temperature: 25° C.

Detection method: electric conductivity

Sample concentration: 5 mg/5 ml

During the analysis described above, the toner as a measurement target may be in a state where an external additive is added thereto or in a state where an external additive is not added thereto.

In the toner set according to the present exemplary embodiment, for example, the cation on the toner surface measured by ion chromatography is preferably one or more kinds of cations selected from an alkali metal and an alkaline earth metal, and more preferably a sodium ion.

Measurement of BET Specific Surface Areas Bw and Bc of Toner

Both the BET specific surface area Bw of the white toner and BET specific surface area Bc of the color toner are measured by the following method.

The BET specific surface area of the toner is a value measured by a BET method, which is a value measured by a nitrogen purge method using a BET specific surface area meter (SA3100, manufactured by Beckman Coulter, Inc.) as a measurement device. Specifically, 2 g of a toner as a measurement target is weighed, put in a sample tube, subjected to a degassing treatment, and measured by an automatic multipoint measurement method, and the obtained numerical value is adopted as a BET specific surface area ($m^2/g$).

The toner for which the BET specific surface area is to be measured is treated such that the external additive is removed from the toner particles. Specifically, 10 g of the toner is dispersed in 40 mL of a 0.2% by mass aqueous Triton X-100 solution, and ultrasonic waves (output: 60 W, frequency: 20 kHz) are continuously applied for 1 hour to the obtained dispersion in a state where the dispersion is kept at a liquid temperature of 20° C.±3° C. The dispersion after the application of ultrasonic waves is centrifuged at a temperature of 20° C.±3° C. under the conditions of a rotor radius of 5 cm×10,000 rpm×2 minutes, and the supernatant is removed. The remaining slurry is dried to obtain a toner having undergone a separation treatment. The BET specific surface area of the obtained toner is measured by the method described above.

Measurement of Volume-Average Particle Sizes Dw and Dc of Toner

Both the volume-average particle size Dc of the white toner and the volume-average particle size Dc of the color toner are obtained by the following method.

The volume-average particle size is measured using COULTER MULTISIZER II (manufactured by Beckman Coulter, Inc.) and using ISOTON-II (manufactured by Beckman Coulter, Inc.) as an electrolytic solution.

For measurement, as a dispersant, 0.5 mg of a toner as a measurement target in an amount of or more and 50 mg or less is added to 2 ml of a 5% aqueous solution a surfactant (for example, preferably sodium alkylbenzene sulfonate). The obtained solution is added to an electrolytic solution in a volume of 100 ml or more and 150 ml or less.

The electrolytic solution in which the toner is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution is drawn from small-sized particles. The particle size at which the cumulative percentage of the particles reaches 50% is defined as a volume-average particle size.

Measurement of Amounts Zw and Zc of Zinc Stearate Particles Added to Exterior

Both the amount Zw of the zinc stearate particles added to the exterior of the white toner particles and the amount Zc of the zinc stearate particles added to the exterior of the color toner particles are measured by the following method.

The amount of zinc stearate can be determined by X-ray fluorescence analysis.

First, zinc stearate is added to toner particles that do not contain zinc stearate, and X-ray fluorescence analysis is performed. A calibration curve is prepared from the result. By using the calibration curve, the amount of zinc stearate with respect to the toner particles as a measurement target (that is, the amount of zinc added to the exterior of the toner particles) is calculated.

The X-ray fluorescence analysis is performed, for example, by using an X-ray fluorescence spectrometer (XRF1500, manufactured by Shimadzu Corporation) under the conditions of an X-ray output of 40 V, 70 mA, a measurement area of 10 mmΦ, and a measurement time of 15 minutes. In addition to the X-ray fluorescence analysis, the quantification may be performed by another analytical method.

Measurement of Amounts Sw and Sc of Small-Particle-Size Component Having Particle Size of 3 μm or Less Both the amount Sw of a small-particle-size component having a particle size of 3 μm or less in the white toner and the amount Sc of a small-particle-size component having a particle size of 3 μm or less in the color toner are measured by the following method.

First, a toner as a measurement target is dispersed in water or the like. The obtained toner dispersion is collected by suction, and a flat flow of the particles is formed. Then, an instant flash of strobe light is emitted to the particles, and the particles are imaged as a still image. By using a flow-type particle image analyzer (FPIA-3000 manufactured by Sysmex Corporation) performing image analysis on the particle image, the average circularity is obtained. The captured particle image is subjected to two-dimensional image processing, and from the projected area, the equivalent circular diameter is calculated. This operation is performed on 4,500 toner particles, image analysis is performed, and statistical processing is performed, thereby calculating the percentage of number [pop %] of particles having a particle size of 3 μm or less (that is, a small-particle-size component).

Measurement of Circularities SFc and SFw of Small-Particle-Size Component Having Particle Size of 3 μm or Less Both the circularity SFw of a small-particle-size component having a particle size of 3 μm or less in the white toner and circularity SFc of a small-particle-size component having a particle size of 3 μm or less in the color toner are measured by the following method.

First, a toner as a measurement target is dispersed in water or the like. The obtained toner dispersion is collected by suction, and a flat flow of the particles is formed. Then, an instant flash of strobe light is emitted to the particles, and the particles are imaged as a still image. By using a flow-type particle image analyzer (FPIA-3000 manufactured by Sysmex Corporation) performing image analysis on the particle image, the average circularity is obtained. The obtained particle image is subjected to two-dimensional image processing. From the projected area, an equivalent circular perimeter and perimeter are calculated, and a circularity is obtained from the following equation.

Circularity=(equivalent circular perimeter)/(perimeter)

[(Perimeter of circle having the same projected area as particle image)/(perimeter of projected particle image)].

This operation is performed on 4,500 toner particles, image analysis is performed, and statistical processing is performed, thereby calculating the circularity of particles having a particle size of 3 μm or less (that is, a small-particle-size component). The mode value is adopted as the circularity.

Hereinafter, the white toner and the color toner will be described.

Unless otherwise specified, in a case where the terms such as "toner", "toner particles", and "external additive" are simply mentioned, these mean "toner", "toner particles", "external additive", and the like of both the white toner and color toner.

The white toner preferably contains, for example, white toner particles and an external additive. The color toner preferably contains, for example, color toner particles and an external additive.

Toner Particles

Both the white toner particles and color toner particles contain a colorant and a binder resin, and preferably additionally contain, for example, an additive such as a release agent, as necessary.

Colorant

White Pigment

For the white toner particles, a white pigment is used as a colorant.

The material of the white pigment is not particularly limited, and examples thereof include an inorganic pigment (for example, titanium oxide, barium sulfate, lead oxide, zinc oxide, lead titanate, potassium titanate, barium titanate, strontium titanate, zirconia, antimony trioxide, lead white, zinc sulfide, barium carbonate, or the like), an organic pigment (for example, a polystyrene resin, a urea formalin resin, a polyacrylic resin, a polystyrene/acrylic resin, a polystyrene/butadiene resin, an alkylbismelamine resin, or the like), and the like.

A pigment having a hollow structure may also be used.

Among these, for example, titanium oxide particles are preferable as a white pigment.

As the white pigment, a white pigment having undergone a surface treatment as necessary may be used, or a dispersant may be used in combination with the white pigment.

A number-average particle size D50p of the white pigment is, for example, preferably 50 nm or more and less than 800 nm, more preferably 100 nm or more and less than 700 nm, and even more preferably 200 nm or more and less than 600 nm.

The particle size distribution of the white pigment is determined as follows.

The white toner particles are mixed with and embedded in an epoxy resin and left to stand overnight for solidification. Then, by using an ultramicrotome device (UltracutUCT, manufactured by Leica Microsystems), for example, a thin piece having a thickness of about 250 nm or more and 450 nm or less is prepared.

The obtained thin piece is observed with an ultra-high resolution field emission scanning electron microscope (S-4800, manufactured by Hitachi High-Tech Corporation) to check the white pigment on the inside of the white toner particles. In a case where the outline portion of the white pigment is unclear, it is possible to adjust the thickness of the observed thin piece and to observe the thin piece again. In a case where there are many blank defects on the inside of the white toner particles, there is a possibility that the white pigment may be detached during the preparation of the thin piece. Therefore, for example, it is preferable to adjust the thickness of the thin piece to increase the thickness. In a case where it is difficult to tell the outline of the white pigment because lots of white pigments appear overlapping each other on the inside of the white toner particles, there is a possibility that the thin piece may be too thick and thus the plurality of white pigments may appear overlapping with each other. Therefore, for example, it is preferable to adjust the thickness of the thin piece to reduce the thickness.

The observed image is digitized and input into image analysis software (Win ROOF) manufactured by MITANI CORPORATION, and the particle size of the white pigment in the white toner particles is determined, for example, by the following procedure.

That is, the cross-sectional area of the toner in the embedding agent is selected as a selection target and subjected to binarization processing using "automatic binarization-discrimination analysis method" of "binarization processing" command, such that the white pigment and a binder resin portion are separated. At this time, the image is compared with the image not yet being subjected to the binarization processing to check whether the white pigment is separate for each particle in the portion of the white pigment region in the binarized image. For the region where the image is binarized in a state where a plurality of particles are connected, the threshold for binarization is adjusted such that each particle is independently binarized. Alternatively, the image is corrected by manually dividing the region such that 1 white pigment particle forms each portion of the white pigment region. The extracted white pigment region is selected, and the maximum Feret diameter is determined and adopted as the particle size of the white pigment.

In a case where binarization cannot be normally performed due to the imaging density or noise of the image, the image may be sharpened by performing "filter-median" processing or edge extraction processing, and then the boundary may be manually set.

For calculating the number-average particle size of the white pigment, by using an image in which about 10 or more and 100 or less white pigments are seen in one field of view is used, the particle size of 300 or more white pigments is measured. A particle size distribution is obtained from the measured particle size, and based on the particle size distribution, a cumulative number-based distribution is drawn from the small-sized particles, and the particle size at which the cumulative percentage of the particles reaches 50% is defined as the number-average particle size D50p.

In a case where the number-average particle size of the white pigment is to be calculated using the white pigment alone, for example, the number-average particle size can be calculated by gently mixing a white pigment with 100 μm zirconia particles, observing the white pigment having adhered to the surface of the zirconia particles with an electron microscope (for example, S-4800, manufactured by Hitachi High-Tech Corporation) to obtain a digitized image, and performing the same image analysis as described above on the image. At this time, in a case where the white pigment is in the aggregated state, the image is corrected by manually dividing the regions such that 1 white pigment particle forms each portion of the white pigment region. Furthermore, the white pigment is attached onto a conductive tape in advance and observed with an electron microscope to prepare an image, the shapes of the observed white pigments are compared with each other, and the white pigment that is deformed due to crushing or the like during the mixing with zirconia particles is excluded from measurement targets.

In a case where it is difficult to observe the white pigment because the white pigments on the surface of zirconia particles overlap or aggregated with each other, the problem can be improved by reducing the proportion of the white pigments to be mixed or adjusting the mixing conditions.

One kind of white pigment may be used alone, or two or more kinds of white pigments may be used in combination.

The content of the white pigment with respect to the total mass of the white toner particles is, for example, preferably 10% by mass or more and 70% by mass or less, more preferably 15% by mass or more and 60% by mass or less, and particularly preferably 20% by mass or more and 55% by mass or less.

Colorant for Color Toner

For the color toner particles, as a colorant, a pigment, a dye, or the like corresponding to the color of the color toner is used.

Specifically, examples of colorants include various pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate, various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye, and the like.

As the colorant, a colorant having undergone a surface treatment as necessary may be used, or a dispersant may be used in combination with the colorant.

One kind of colorant may be used alone, or two or more kinds of colorants may be used in combination.

The content of the colorant with respect to the total mass of the color toner particles is, for example, preferably 1% by mass or more and 30% by mass or less, and more preferably 3% by mass or more and 15% by mass or less.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

As the binder resin, for example, a polyester resin is preferable.

Examples of the polyester resin include known polyester resins.

Examples of the polyester resin include a polycondensate of a polyvalent carboxylic acid and a polyhydric alcohol. As the polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, for example, aromatic diols and alicyclic diols are preferable as the polyhydric alcohol, and aromatic diols are more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K 7121-1987, "Testing methods for transition temperatures of plastics".

The weight-average molecular weight (Mw) of the polyester resin is, for example, preferably 5,000 or more and 1,000,000 or less, and more preferably 7,000 or more and 500,000 or less.

The number-average molecular weight (Mn) of the polyester resin is, for example, preferably 2,000 or more and 100,000 or less.

The molecular weight distribution Mw/Mn of the polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC·HCL-8120GPC manufactured by Tosoh Corporation as a measurement device, TSKgel Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The polyester resin is obtained by a well-known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is being distilled off. In a case where a monomer with poor compatibility takes part in the copolymerization reaction, for example, the monomer with poor compatibility may be condensed in advance with an acid or an alcohol that is to be polycondensed with the monomer, and then polycondensed with the major component.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

Release Agent

Examples of the release agent include hydrocarbon-based wax; natural wax such as carnauba wax, rice wax, and candelilla wax; synthetic or mineral·petroleum-based wax such as montan wax; ester-based wax such as fatty acid esters and montanic acid esters; and the like. The release agent is not limited to these.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total amount of the toner particles is, for example, preferably 1% by mass or more and 20% by mass or less, and more preferably 5% by mass or more and 15% by mass or less.

Other Additives

Examples of other additives include well-known additives such as a magnetic material, a charge control agent, and inorganic powder. These additives are incorporated into the toner particles as internal additives.

Characteristics of Toner Particles and the Like

The toner particles may be toner particles that have a single-layer structure or toner particles having a so-called core/shell structure that is configured with a core portion (core particle) and a coating layer (shell layer) covering the core portion.

The toner particles having a core/shell structure may, for example, be configured with a core portion that is configured with a binder resin and other additives used as necessary, such as a colorant and a release agent, and a coating layer that is configured with a binder resin.

The volume-average particle size (D50v) of the toner particles is, for example, preferably 3 μm or more and 10 μm or less, and more preferably 4 μm or more and 8 μm or less.

The volume-average particle size (D50v) of the toner particles is determined by the aforementioned method of obtaining the volume-average particle size of the toner.

The average circularity of the toner particles is, for example, preferably 0.80 or more and 1.00 or less, and more preferably 0.90 or more and 0.98 or less.

The average circularity of the toner particles is determined by (equivalent circular perimeter)/(perimeter) [(perimeter of circle having the same projected area as particle image)/(perimeter of projected particle image)]. Specifically, the average circularity is a value measured by the following method.

First, toner particles as a measurement target are collected by suction, and a flat flow of the particles is formed. Then, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for determining the average circularity is 3,500.

In a case where a toner contains external additives, the toner (developer) as a measurement target is dispersed in water containing a surfactant, then the dispersion is treated with ultrasonic waves such that the external additives are removed, and the toner particles are collected.

Manufacturing Method of Toner

Next, the manufacturing methods of the white toner and the color toner will be described.

Both the white toner and color toner are suitably obtained, for example, by manufacturing toner particles and then adding an external additive to the exterior of the toner particles.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). There are no particular restrictions on these manufacturing methods, and known manufacturing methods are adopted.

Examples of aggregation and coalescence methods include the methods described in JP2010-97101A and JP2006-154641A.

Examples of kneading and pulverizing methods include the methods described in JP2000-267338A.

Examples of dissolution suspension methods include the method described in JP2000-258950A.

Among the above manufacturing methods, for example, a kneading and pulverizing method is preferably used to manufacture the white toner particles, because the kneading and pulverizing method can make a complicated pulverization interface in a pulverizing step and can reduce the amount of cations with respect to the surface area of the toner.

In addition, for example, an aggregation and coalescence method is preferably used to manufacture the color toner particles, because the aggregation and coalescence method can further reduce the BET specific surface area of the toner and can control the amount of the cation on the toner surface to increase the amount of the cation.

Manufacturing of White Toner Particles

The manufacturing method of the white toner particles using a kneading and pulverizing method will be described.

The kneading and pulverizing method is a method of obtaining toner particles through a kneading step of melting and kneading toner forming materials (that is, a white pigment, a binder resin, and the like) to obtain a kneaded material and a pulverizing step of pulverizing the obtained kneaded material.

Each step relating to the kneading and pulverizing method will be specifically described.

Kneading Step

In the kneading step, toner forming materials including a binder resin, a white pigment, a release agent used as necessary, and the like are kneaded.

In the kneading step, for example, it is desirable to add 0.5 parts by mass or more and 5 parts by mass or less of an aqueous medium to 100 parts by mass of the toner forming materials. As the aqueous medium, for example, water such as distilled water or deionized water or a medium obtained by adding a surfactant (for example, an ionic surfactant containing the aforementioned cation) to an aqueous medium such as alcohols is preferable. The shearing during kneading makes it easier to finely disperse the aqueous medium in a resin or makes it easy to generate fine air bubbles in the kneaded material. Due to the influence of air bubbles, the pulverized material has a more complicated surface shape.

Examples of the kneader used in the kneading step include known kneaders such as a single-screw extruder and a twin-screw extruder.

The kneader has a mechanism for injecting the aforementioned aqueous medium. In the kneader, the toner forming materials and the aqueous medium are mixed together, and the toner forming materials are cooled by the latent heat of evaporation of the aqueous medium, which keeps the temperature of the toner forming materials.

The melting temperature may be determined depending on the type, mixing ratio, and the like of the binder resin and the like to be kneaded.

Cooling Step

In the cooling step, the kneaded material formed by the kneading step is cooled.

In the cooling step, for example, the temperature of the kneaded material at the end of the kneading step is cooled to 40° C. or lower at an average cooling rate of 15° C./sec or less.

The average cooling rate is an average of the rate at which the temperature of the kneaded material at the end of the kneading step is cooled to 40° C.

Examples of cooling methods in the cooling step include a method using a rolling roll in which cold water or brine is circulated, a sandwiching type cooling belt, or the like. In a case where cooling is performed by the above method, the cooling rate is determined by the speed of the rolling roll, the flow rate of brine, the supply amount of the kneaded material, the slab thickness at the time of rolling the kneaded material, and the like. In a case where cooling is performed using cold water, sometimes the cations contained in the cold water are incorporated into the toner particles.

Pulverizing Step

In the pulverizing step, the kneaded material cooled by the cooling step is pulverized.

Examples of pulverizers used in the pulverizing step include known pulverizers such as a mechanical pulverizer and a jet pulverizer.

Classification Step

In a classification step, as necessary, the pulverized material (particles) obtained by the pulverizing step is classified to obtain toner particles having the target average particle size.

Examples of classifiers used in the classification step include known classifiers such as a centrifugal classifier and an inertial classifier.

By the classification step, fine powder (particles having a particle size smaller than the particle size in a target range) and coarse powder (particles having a particle size larger than the particle size in a target range) are removed.

Shape Control Processing Step

After the classification step, as necessary, in order to obtain toner particles having a target circularity, a hot air treatment step of applying hot air to the toner, a heat treatment step of performing a heat treatment while dispersing the toner in an aqueous medium under stirring, or the like may be performed.

The amount of cations in the white toner can be controlled by the amount of a cationic surfactant added during kneading or the amount of an ionic surfactant added in the shape control processing step or by washing.

The white toner particles are obtained through the above steps.

Manufacturing of Color Toner Particles

The manufacturing method of the color toner particles using an aggregation and coalescence method will be described.

In a case where the color toner particles are manufactured by the aggregation and coalescence method, the toner particles are manufactured through a step of preparing a resin particle dispersion in which binder resin particles are dispersed and a colorant particle dispersion in which a colorant is dispersed (a dispersion preparing step), a step of mixing together the resin particle dispersion and the colorant particle dispersion and aggregating the resin particles and the colorant particles (other particles as necessary) in the mixed dispersion (in the mixed dispersion obtained after another particle dispersion is mixed in as necessary) to form aggregated particles (aggregated particle forming step), and a step of heating an aggregated particle dispersion in which the aggregated particles are dispersed to allow the aggregated particles to undergo coalescence and to form toner particles (coalescence step).

Hereinafter, each of the steps will be specifically described.

In the following section, a method for obtaining resin particles containing a binder resin, a colorant, and a release agent will be described. The release agent is used as necessary. It goes without saying that other additives different from the release agent may also be used.

Resin Particle Dispersion-Preparing Step

For example, another colorant particle dispersion in which colorant particles are dispersed and a release agent particle dispersion in which release agent particles are dispersed are prepared together with the resin particle dispersion in which resin particles to be a binder resin are dispersed.

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

Among these, for example, it is preferable to use a nonionic surfactant, and it is preferable to use a nonionic surfactant in combination with an anionic surfactant or a cationic surfactant.

One kind of surfactant may be used alone, or two or more kinds of surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the dispersion medium by using a transitional phase inversion emulsification method. The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), such that the resin undergoes phase transition from W/O to O/W and is dispersed in the aqueous medium in the form of particles.

The volume-average particle size of the resin particles dispersed in the resin particle dispersion is, for example, preferably 0.01 μm or more and 1 μm or less, more preferably 0.03 μm or more and 0.8 μm or less, and even more preferably 0.05 μm or more and 0.6 μm or less.

For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

For example, a colorant particle dispersion and a release agent particle dispersion are prepared in the same manner as that adopted for preparing the resin particle dispersion. That is, the volume-average particle size of particles, the dispersion medium, the dispersion method, and the particle content in the resin particle dispersion are also applied to the colorant particles to be dispersed in the colorant particle dispersion and the release agent particles to be dispersed in the release agent particle dispersion.

Aggregated Particle Forming Step

Next, the resin particle dispersion is mixed with the colorant particle dispersion and the release agent particle dispersion.

Then, in the mixed dispersion, the resin particles, the colorant particles, and the release agent particles are heteroaggregated such that aggregated particles are formed which have a diameter close to the diameter of the target resin particles and include the resin particles, other colorant particles, and the release agent particles.

Specifically, for example, an aggregating agent is added to the mixed dispersion, the pH of the mixed dispersion is adjusted such that the dispersion is acidic (for example, pH of 2 or higher and 5 or lower), and a dispersion stabilizer is added thereto as necessary. Then, the dispersion is heated to a temperature close to the glass transition temperature of the resin particles (specifically, for example, to a temperature equal to or higher than the glass transition temperature of the resin particles—30° C. and equal to or lower than the glass transition temperature of the resin particles—10° C.) such that the particles dispersed in the mixed dispersion are aggregated, thereby forming aggregated particles.

In the aggregated particle forming step, for example, in a state where the mixed dispersion is being stirred with a rotary shearing homogenizer, an aggregating agent may be added thereto at room temperature (for example, 25° C.), the pH of the mixed dispersion may be adjusted such that the dispersion is acidic (for example, pH of 2 or higher and 5 or lower), a dispersion stabilizer may be added to the dispersion as necessary, and then the dispersion may be heated.

Examples of the aggregating agent include a surfactant having polarity opposite to the polarity of the surfactant contained in the mixed dispersion, an inorganic metal salt, and a metal complex having a valency of 2 or higher. In a case where a metal complex is used as the aggregating agent, the amount of the surfactant used is reduced, and the charging characteristics are improved.

In addition to the aggregating agent, an additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); and the like.

The amount of the aggregating agent added with respect to 100 parts by mass of resin particles is, for example, preferably 0.01 parts by mass or more and 5.0 parts by mass or less, and more preferably 0.1 parts by mass or more and less than 3.0 parts by mass.

Coalescence Step

The aggregated particle dispersion in which the aggregated particles are dispersed is then heated to, for example, a temperature equal to or higher than the glass transition temperature of the resin particles (for example, a temperature higher than the glass transition temperature of the resin particles by 30° C. to 50° C.) and a temperature equal to or higher than the melting temperature of the release agent such that the aggregated particles coalesce, thereby forming toner particles.

In the coalescence step, at a temperature equal to or higher than the glass transition temperature of the resin particles and the temperature equal to or higher than the melting temperature of the release agent, the resin and the release agent are in a fused state. Then, cooling is performed, thereby obtaining resin particles.

Toner particles are obtained through the above steps.

The toner particles may be manufactured through a step of obtaining an aggregated particle dispersion in which the aggregated particles are dispersed, then mixing the aggregated particle dispersion with a resin particle dispersion in which resin particles are dispersed to cause the resin particles to be aggregated and adhere to the surface of the aggregated particles and to form second aggregated particles, and a step of heating a second aggregated particle dispersion in which the second aggregated particles are dispersed to cause the second aggregated particles to coalesce and to form resin particles having a core/shell structure.

After the coalescence step ends, the toner particles formed in a solution are subjected to known washing step, solid-liquid separation step, and drying step, thereby obtaining dry toner particles. As the washing step, from the viewpoint of charging properties, for example, displacement washing may be thoroughly performed using deionized water. Using an alkali (specifically, sodium hydroxide) in the washing step makes it possible to control the amount of the cation on the surface of the toner. As the solid-liquid separation step, from the viewpoint of productivity, for example, suction filtration, pressure filtration, or the like may be performed. As the drying step, from the viewpoint of productivity, for example, freeze-drying, flush drying, fluidized drying, vibratory fluidized drying, or the like may be performed.

Then, by adding an external additive to the dry toner particles obtained as above and mixing together the external additive and the toner particles, the white toner and the color toner are manufactured. The mixing may be performed, for example, using a V blender, a Henschel mixer, a Lödige mixer, or the like.

Furthermore, coarse particles of the resin particles may be removed as necessary by using a vibratory sieving machine, a pneumatic sieving machine, or the like.

Electrostatic Charge Image Developer Set

The electrostatic charge image developer set according to the present exemplary embodiment has a first electrostatic charge image developer containing the white toner in the toner set according to the present exemplary embodiment and a second electrostatic charge image developer containing the color toner in the toner set according to the present exemplary embodiment.

Each of the electrostatic charge image developers may be a one-component developer which contains only the toner or a two-component developer which is obtained by mixing together the toner and a carrier.

The carrier is not particularly limited, and examples thereof include known carriers. Examples of the carrier include a coated carrier obtained by coating the surface of a core material consisting of magnetic powder with a coating resin; a magnetic powder dispersion-type carrier obtained by dispersing magnetic powder in a matrix resin and mixing the powder and the resin together; a resin impregnation-type carrier obtained by impregnating porous magnetic powder with a resin; and the like.

Each of the magnetic powder dispersion-type carrier and the resin impregnation-type carrier may be a carrier obtained by coating a core material, which is particles configuring the carrier, with a coating resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like.

The coating resin and the matrix resin may contain other additives such as conductive particles.

Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a coating resin, for example, by a coating method using a solution for forming a coating layer obtained by dissolving the coating resin and various additives, which are used as necessary, in an appropriate solvent, and the like. The solvent is not particularly limited, and may be selected in consideration of the type of the coating resin used, coating suitability, and the like.

Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and removing solvents; and the like.

The mixing ratio (mass ratio) between the toner and the carrier, represented by toner:carrier, in the two-component developer is, for example, preferably 1:100 to 30:100, and more preferably 3:100 to 20:100.

Image Forming Apparatus/Image Forming Method

The image forming apparatus/image forming method according to the present exemplary embodiment will be described.

The image forming apparatus according to the present exemplary embodiment includes a first image forming unit that forms a first image by the white toner in the toner set according to the present exemplary embodiment, a second image forming unit that forms a second image by the color toner in the toner set according to the present exemplary embodiment, an intermediate transfer member that transfers the first image and the second image, a primary transfer unit that transfers the first image and the second image to a surface of the intermediate transfer member, a secondary transfer unit that transfers the first image and the second image transferred to the surface of the intermediate transfer member to a surface of a recording medium, an intermediate transfer member-cleaning unit that has a blade coming into contact with the surface of the intermediate transfer member and cleans the surface of the intermediate transfer member by the blade, and a fixing unit that fixes the first image and the second image on the surface of the recording medium.

The image forming apparatus according to the present exemplary embodiment may have an aspect in which the image forming apparatus has, as the first and second image forming units, an image forming unit each having an image holder, a charging unit that charges a surface of the image holder, an electrostatic charge image forming unit that forms an electrostatic charge image on the charged surface of the image holder, and first and second developing units that develop the electrostatic charge image formed on the surface of the image holder by an electrostatic charge image developer as a toner image. At this time, for example, the first developing unit preferably stores the first electrostatic charge image developer containing the white toner in the toner set according to the present exemplary embodiment, and the second developing unit preferably stores the second electrostatic charge image developer containing the color toner in the toner set according to the present exemplary embodiment.

In the image forming apparatus according to the present exemplary embodiment, an image forming method (image forming method according to the present exemplary embodiment) is performed which has a first image forming step of forming a first image by the white toner in the toner set according to the present exemplary embodiment, a second image forming step of forming a second image by the color toner in the toner set according to the present exemplary embodiment, a first transfer step of transferring the first image and the second image to a surface of an intermediate transfer member, a secondary transfer step of transferring the first image and the second image transferred to the surface of the intermediate transfer member to a surface of a recording medium, an intermediate transfer member-cleaning step of cleaning the surface of the intermediate transfer member by a blade brought into contact with the surface of the intermediate transfer member after the first image and the second image are transferred to the surface of the recording medium, and a fixing step of fixing the first image and the second image on the surface of the recording medium.

As the image forming apparatus according to the present exemplary embodiment, a well-known image forming apparatus may be used such as an apparatus including a charge neutralizing unit that neutralizes charge by irradiating the surface of the image holder with charge neutralizing light before charging after the transfer of the toner image.

An example of the image forming apparatus according to the present exemplary embodiment will be described below, but the present invention is not limited thereto. Hereinafter, among the parts shown in the drawing, main parts will be described, and others will not be described.

FIG. 1 is a view schematically showing the configuration of the image forming apparatus according to the present exemplary embodiment, which shows an intermediate transfer-type 5-unit tandem image forming apparatus.

The image forming apparatus shown in FIG. 1 includes first to fifth image forming units 50Y, 50M, 50C, 50K, and 50B (image forming units) adopting an electrophotographic method that prints out images of colors, yellow (Y), magenta (M), cyan (C), black (K), and white (B) based on color-separated image data. These image forming units (hereinafter, simply called "units" in some cases) 50Y, 50M, 50C, 50K, and 50B are arranged in a row in the horizontal direction in a state of being spaced apart by a predetermined distance. The units 50Y, 50M, 50C, 50K, and 50B may be process cartridges that are detachable from the image forming apparatus.

An intermediate transfer belt (an example of an intermediate transfer member) 33 passing through the units 50Y, 50M, 50C, 50K, and 50B extends under the units. The intermediate transfer belt 33 is looped around a driving roll 22, a support roll 23, and an opposing roll 24 that are in contact with the inner surface of the intermediate transfer belt 33, and runs toward a fifth unit 50B from a first unit 50Y (in FIG. 1, the direction of an arrow B). An intermediate transfer member-cleaning device 26 facing the driving roll 22 is provided on the image holding surface side of the intermediate transfer belt 33. Furthermore, on the upstream side in the rotation direction of the intermediate transfer belt 33 with respect to the intermediate transfer member-cleaning device 26, a voltage applying device (not shown in the drawing) is provided which makes a potential difference between the intermediate transfer belt 33 and the support roll 23 such that an electric field occurs between the intermediate transfer belt 33 and the support roll 23.

Each of the yellow, magenta, cyan, black, and white toners stored in the containers of the toner cartridges 40Y, 40M, 40C, 40K, and 40B is supplied to developing devices (an example of developing units) 20Y, 20M, 20C, 20K, and 20B of units 50Y, 50M, 50C, 50K, and 50B respectively.

The first to fifth units 50Y, 50M, 50C, 50K, and 50B have the same configuration and action and perform the same operation. Therefore, in the present specification, as a representative, the first unit 50Y will be described which is placed on the upstream side of the running direction of the intermediate transfer belt and forms a yellow image.

The first unit 50Y has a photoreceptor 21Y that acts as an image holder. Around the photoreceptor 21Y, a charging roll 28Y (an example of charging unit) that charges the surface of the photoreceptor 21Y at a predetermined potential, an exposure device (an example of electrostatic charge image forming unit) 19Y that exposes the charged surface to a laser beam based on color-separated image signals to form an electrostatic charge image, a developing device (an example of developing unit) 20Y that develops the electrostatic charge image by supplying a toner to the electrostatic charge image, a primary transfer roll (an example of primary transfer unit) 17Y that transfers the developed toner image onto the intermediate transfer belt 33, and a photoreceptor cleaning device (an example of cleaning unit) 15Y that removes the residual toner on the surface of the photoreceptor 21Y after the primary transfer are arranged in this order.

The primary transfer roll 17Y is disposed on the inner side of the intermediate transfer belt 33, at a position facing the photoreceptor 21Y. A bias power supply (not shown in the drawing) for applying a primary transfer bias is connected to primary transfer rolls 17Y, 17M, 17C, 17K, and 17B of each unit. Each bias power supply changes the transfer bias applied to each primary transfer roll under the control of a control unit not shown in the drawing.

Hereinafter, the operation that the first unit 50Y carries out to form a yellow image will be described.

First, prior to the operation, the surface of the photoreceptor 21Y is charged to a potential of −600 V to −800 V by the charging roll 28Y.

The photoreceptor 21Y is formed of a photosensitive layer laminated on a conductive (for example, volume resistivity at 20° C.: $1\times10^{-6}$ Ω cm or less) substrate. The photosensitive layer has properties in that although this layer usually has a high resistance (resistance of a general resin), in a case where the photosensitive layer is irradiated with a laser beam, the specific resistance of the portion irradiated with the laser beam changes. Therefore, from an exposure device 19Y, the laser beam is radiated to the surface of the charged photoreceptor 21Y according to the image data for yellow transmitted from the control unit not shown in the drawing. As a result, an electrostatic charge image of the yellow image pattern is formed on the surface of the photoreceptor 21Y.

The electrostatic charge image is an image formed on the surface of the photoreceptor 21Y by charging. This image is a so-called negative latent image formed in a manner in which the charges with which the surface of the photoreceptor 21Y is charged flow due to the reduction in the specific resistance of the portion of the photosensitive layer irradiated with the laser beam from the exposure device 19Y, but the charges in a portion not being irradiated with the laser beam remain.

The electrostatic charge image formed on the photoreceptor 21Y rotates to a predetermined development position as the photoreceptor 21Y runs. At the development position, the electrostatic charge image on the photoreceptor 21Y is developed as a toner image by the developing device 20Y and visualized.

The developing device 20Y contains, for example, an electrostatic charge image developer that contains at least a yellow toner and a carrier. By being agitated in the developing device 20Y, the yellow toner undergoes triboelectrification, carries charges of the same polarity (negative polarity) as the charges with which the surface of the photoreceptor 21Y is charged, and is held on a developer roll (an example of a developer holder). Then, as the surface of the photoreceptor 21Y passes through the developing device 20Y, the yellow toner electrostatically adheres to the neutralized latent image portion on the surface of the photoreceptor 21Y, and the latent image is developed by the yellow toner. The photoreceptor 21Y on which the yellow toner image is formed keeps on running at a predetermined speed, and the toner image developed on the photoreceptor 21Y is transported to a predetermined primary transfer position.

In a case where the yellow toner image on the photoreceptor 21Y is transported to the primary transfer position, a primary transfer bias is applied to the primary transfer roll 17Y, and electrostatic force heading for the primary transfer roll 17Y from the photoreceptor 21Y acts on the toner image. As a result, the toner image on the photoreceptor 21Y is transferred onto the intermediate transfer belt 33. The transfer bias applied at this time has a polarity (+) opposite to the polarity (−) of the toner. In the first unit 50Y, the transfer bias is set, for example, to +10 μA under the control of the control unit (not shown in the drawing).

Meanwhile, the residual toner on the photoreceptor 21Y is removed by a photoreceptor cleaning device 15Y and collected.

The primary transfer bias applied to the primary transfer rolls 17M, 17C, 17K, and 17B following the second unit 50M is also controlled according to the first unit.

In this way, the intermediate transfer belt 33 to which the yellow toner image is transferred in the first unit 50Y is sequentially transported through the second to fifth units 50M, 50C, 50K, and 50B, and the toner images of each color are superposed and transferred in layers.

The intermediate transfer belt 33, to which the toner images of 5 colors are transferred in layers through the first to fifth units, reaches a secondary transfer portion configured with the intermediate transfer belt 33, the opposing roll 24 in contact with the inner surface of the intermediate transfer belt, and a secondary transfer roll (an example of a secondary transfer unit) 34 disposed on the side of the image holding surface of the intermediate transfer belt 33. Meanwhile, via a supply mechanism, recording paper P (an example of a recording medium) is supplied at a predetermined timing to the gap between the secondary transfer roll 34 and the intermediate transfer belt 33 that are in contact with each other. Furthermore, secondary transfer bias is applied to the opposing roll 24. The transfer bias applied at this time has the same polarity (−) as the polarity (−) of the toner. The electrostatic force heading for the recording paper P from the intermediate transfer belt 33 acts on the toner image, which makes the toner image on the intermediate transfer belt 33 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

Then, the recording paper P is transported into a pressure contact portion (nip portion) of a pair of fixing rolls in the fixing device 35 (an example of fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet and the like, in addition to the recording paper P.

In order to further improve the smoothness of the image surface after fixing, for example, it is preferable that the surface of the recording paper P be also smooth. For instance, coated paper prepared by coating the surface of plain paper with a resin or the like, art paper for printing, and the like are suitably used.

The recording paper P on which the color image has been fixed is transported to an output portion, and a series of color image forming operations is finished.

The image forming apparatus shown in FIG. 1 is an image forming apparatus having a configuration that enables toner cartridges 40Y, 40M, 40C, 40K, and 40B to be detachable from the apparatus. The developing devices 20Y, 20M, 20C, 20K, and 20B are connected to toner cartridges corresponding to the respective developing devices (colors) by a toner supply pipe not shown in the drawing. In a case where the amount of the toner contained in the container of the toner cartridge is low, the toner cartridge is replaced.

Process Cartridge/Toner Cartridge Set

The process cartridge according to the present exemplary embodiment will be described.

The process cartridge according to the present exemplary embodiment is a process cartridge which includes a first developing unit that stores the first electrostatic charge image developer in the electrostatic charge image developer set according to the present exemplary embodiment and a second developing unit that stores the second electrostatic charge image developer in the electrostatic charge image developer set according to the present exemplary embodiment and is detachable from an image forming apparatus.

The process cartridge according to the present exemplary embodiment is not limited to the above configuration. The process cartridge may be configured with a developing device and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
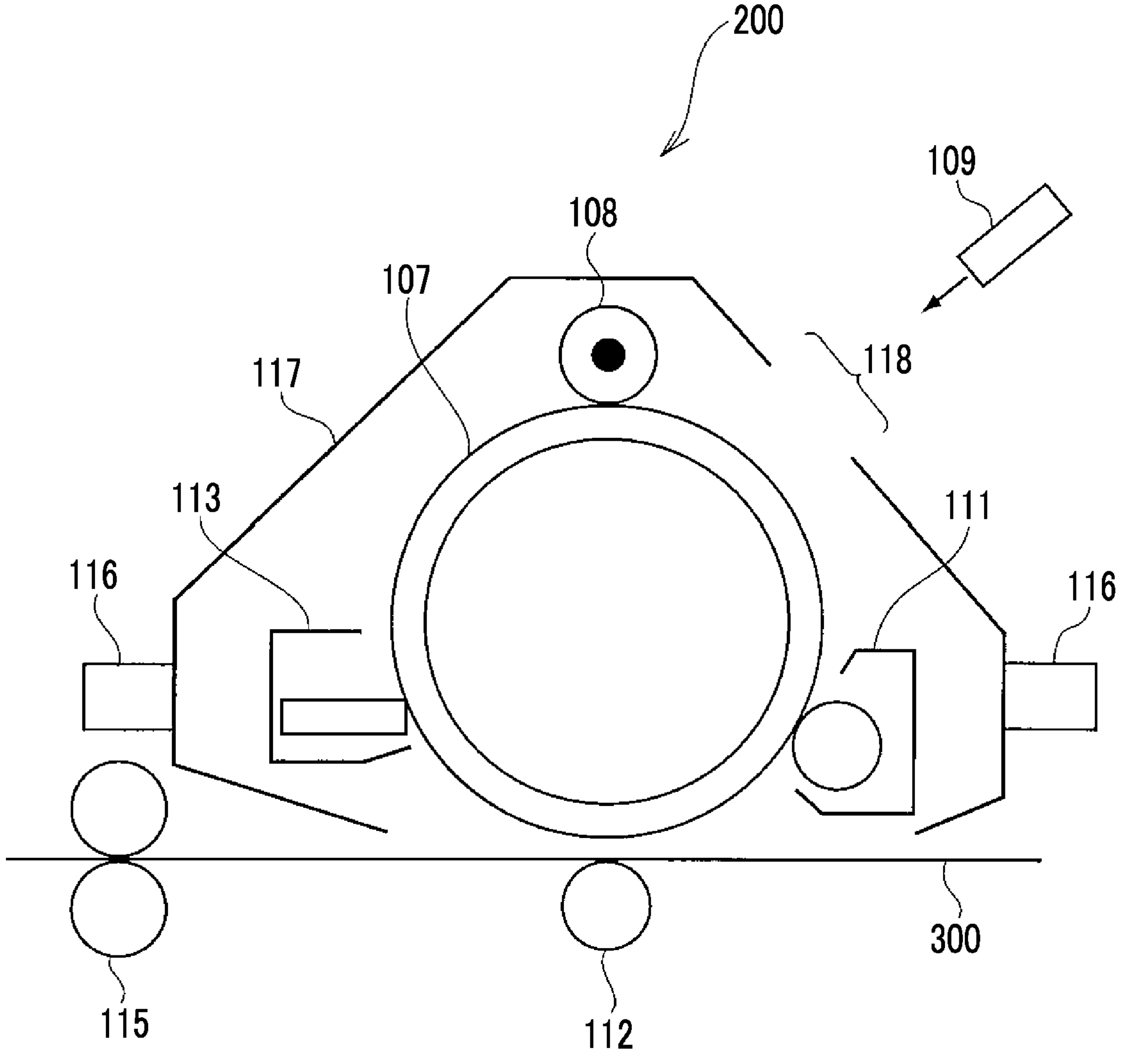
FIG. 2 is a view schematically showing an example of the configuration of the process cartridge according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of an image holder), a charging roll 108 (an example of a charging unit) that is provided on the periphery of the photoreceptor 107, a developing device 111 (an example of a developing unit), a photoreceptor cleaning device 113 (an example of a cleaning unit), which are integrally combined and held in the housing 117. The process cartridge 200 forms a cartridge in this way.

In FIG. 2, 109 represents an exposure device (an example of an electrostatic charge image forming unit), 112 represents a primary transfer roll (an example of a primary transfer unit), 120 represents an intermediate transfer belt (an example of an intermediate transfer member), 122 represents a driving roll that also functions as an intermediate transfer belt-neutralizing unit (an example of an intermediate transfer member-neutralizing unit), 124 represents a support roll, 126 represents a secondary transfer roll (an example of a secondary transfer unit), 128 represents a fixing device (an example of a fixing unit), and 300 represents recording paper (an example of a recording medium).

Next, the toner cartridge set according to the present exemplary embodiment will be described.

The toner cartridge set according to the present exemplary embodiment is a toner cartridge set which has a first toner cartridge that has a container containing a white toner in the toner set according to the present exemplary embodiment and a second toner cartridge that has a container containing the color toner in the toner set according to the present exemplary embodiment, and is detachable from an image forming apparatus.

Each of the toner cartridges includes a container that contains a replenishing toner to be supplied to each developing unit provided in the image forming apparatus.

EXAMPLES

Hereinafter, the present exemplary embodiments will be more specifically described with reference to examples and comparative examples. However, the present exemplary embodiments are not limited to the examples. In addition, unless otherwise specified, "part" and "%" showing amounts are based on mass.

Preparation of Amorphous Polyester Resin

- Polyoxypropylene (2,2)-2,2-bis(4-hydroxyphenylpropane): 90 parts
- Ethylene glycol: 10 parts
- Terephthalic acid: 80 parts
- Isophthalic acid: 10 parts
- n-Dodecenyl succinic acid: 10 parts The above raw materials are put in a heat-dried two-neck flask, dibutyl tin oxide is added thereto as a catalyst, a nitrogen gas is introduced into the flask, the flask is heated in an inert atmosphere. Thereafter, a copolycondensation reaction is performed at 230° C. for about 12 hours, then pressure is reduced at 250° C. for removal, thereby synthesizing an amorphous polyester resin (A).

The obtained amorphous polyester resin (A) has a weight-average molecular weight of 15,400 and a glass transition temperature of 64° C.

Preparation of Crystalline Polyester Resin

- 1,10-Decanedicarboxylic acid: 160 parts
- 1,6-Hexanediol: 100 parts
- Dibutyl tin oxide (catalyst): 0.2 parts The above materials are put in a heat-dried reaction vessel, the air in the reaction vessel is purged with a nitrogen gas to create an inert atmosphere, and mechanical stirring is performed at 180° C. for 5 hours under reflux. Then, the reaction vessel is slowly heated to 230° C. under reduced pressure, stirring is performed for 2 hours, and the reaction mixture is air-cooled at a point in time when the mixture is viscous such that the reaction is stopped, thereby polymerizing a crystalline polyester resin (C).

The obtained crystalline polyester resin (C) has a weight-average molecular weight of 11,600 and a melting temperature of 72° C.

Preparation of Toner Particles

Preparation of White Toner Particles (W1)

- Amorphous polyester resin (A): 95 parts
- Crystalline polyester resin (C): 5 parts
- Titanium oxide (manufactured by ISHIHARA SANGYO KAISHA, LTD., CR-60): 40 parts
- Paraffin wax (manufactured by NIPPON SEIRO CO., LTD., HNP-9): 10 parts The above raw materials are premixed in a Henschel mixer, and then kneaded with a twin-screw extrusion kneader having a screw configuration of a feeding portion-kneading portion-feeding portion-kneading portion-feeding portion under the following conditions. The rotation speed of the screw is set to 500 revolutions per minute (rpm), and the supply amount is set to 50 kg. In the aforementioned intermediate feeding portion, an aqueous medium of 1.5 parts of distilled water and 0.02 parts of an anionic surfactant (DKS Co. Ltd., NEOGEN RK) is added with respect to 100 parts of a supply amount of the raw materials.

The kneaded material is rapidly cooled by a rolling roll through which brine is passed and a cold water-cooled slab sandwiching-type cooling belt, coarsely pulverized by a pin mill, and then crushed by a hammer mill. Then, the crushed material is pulverized with a pulverizer (AFG400) having a built-in coarse powder pulverizing classifier, thereby obtaining white toner particles (W1) having a volume-average particle size of 7.5

Preparation of White Toner Particles (W1-1)

White toner particles (W1-1) are obtained in the same manner as in the preparation of the white toner particles (W1), except that the crystalline polyester resin (C) is not added.

Preparation of White Toner Particles (W2)

White toner particles (W2) are obtained in the same manner as in the preparation of the white toner particles (W1), except that the amount of anionic surfactant (DKS Co. Ltd., NEOGEN RK) of the aqueous medium to be added in the intermediate feeding portion is changed to 0.05 parts.

Preparation of White Toner Particles (W3)

Preparation of Dispersion of Amorphous Polyester Resin (A)

Ethyl acetate (40 parts) and 25 parts of 2-butanol are put in a vessel equipped with a temperature control unit and a nitrogen purge unit, thereby preparing a mixed solvent. Then, 100 parts of the amorphous polyester resin (A) is slowly added to and dissolved in the solvent, a 10% aqueous ammonia solution (in an amount equivalent to 3 times the acid value of the resin in terms of molar ratio) is added thereto, and the mixed solution is stirred for 30 minutes. Thereafter, the reaction container is cleaned out by dry nitrogen purging, and in a state where the mixed solution is being stirred at a temperature kept at 40° C., 400 parts of deionized water is added dropwise thereto at a rate of 2 parts/min such that the mixed solution is emulsified. After dropwise addition ends, the emulsion is returned to 25° C., and the solvent is removed under reduced pressure, thereby obtaining a resin particle dispersion in which resin particles having a volume-average particle size of 160 nm are dispersed. Deionized water is added to the resin particle dispersion, and the concentration of the solid content thereof is adjusted to 25%, thereby obtaining an amorphous polyester resin particle dispersion (A).

Preparation of Dispersion of Crystalline Polyester Resin (C)

The crystalline polyester resin (C) (90 parts), 1.8 parts of an anionic surfactant (DKS Co. Ltd., NEOGEN RK), and 210 parts of deionized water are mixed together, heated to 120° C., and dispersed using a homogenizer (ULTRA-TURRAX T50 manufactured by IKA). Then, the mixture is subjected to a dispersion treatment using a pressure jet-type Gorlin homogenizer for 1 hour, thereby obtaining a resin particle dispersion in which resin particles having a volume-average particle size of 160 nm are dispersed. Deionized water is added to the resin particle dispersion, and the concentration of the solid content thereof is adjusted to 25%, thereby obtaining a crystalline polyester resin particle dispersion (C).

Preparation of White Pigment Dispersion

Titanium oxide (manufactured by ISHIHARA SANGYO KAISHA, LTD., CR-60): 100 parts

Nonionic surfactant (NONIPOL 400: manufactured by Sanyo Chemical Industries, Ltd.): 10 parts Deionized water: 400 parts The above components are mixed together, stirred for 30 minutes using a homogenizer (ULTRA-TURRAX T50: manufactured by IKA), and then subjected to a dispersion treatment for 1 hour by using a high-pressure impact disperser ULTIMIZER (HJP30006: manufactured by SUGINO MACHINE LIMITED), thereby preparing a pigment dispersion having a concentration of solid content of 25%.

Preparation of Release Agent Particle Dispersion

An ester wax (270 parts, melting temperature 72° C., manufactured by NIPPON SEIRO CO., LTD.), 15 parts of an anionic surfactant (NEOGEN RK manufactured by DKS Co. Ltd.), and 20 parts of deionized water are mixed together, and a release agent is dissolved in the mixture by using a pressure jet-type homogenizer (Gorlin homogenizer manufactured by Gorlin) at an internal solution temperature of 120° C. Then, the mixture is subjected to a dispersion treatment for 120 minutes at a dispersion pressure of 5 MPa and then for 360 minutes at 40 MPa, followed by cooling. Deionized water is added thereto such that the concentration of solid content is 25%, thereby obtaining a release agent particle dispersion (1). The volume-average particle size of the particles in the release agent particle dispersion is 220 nm.

Preparation of White Toner Particles (W3)

Amorphous polyester resin (A) dispersion (concentration of solid content 25%): 400 parts Crystalline polyester resin (C) dispersion (concentration of solid content 25%): 40 parts White pigment dispersion (concentration of solid content 25%): 160 parts Release agent particle dispersion (concentration of solid content 25%): 40 parts The above raw materials are mixed together in a stainless steel flask and stirred for 30 minutes. Then, 75 parts of a 10% aqueous aluminum sulfate solution is added dropwise thereto, followed by mixing and dispersion by a homogenizer. Then, the mixture is heated to 45° C. under stirring, and kept at 45° C. for 30 minutes. Then, 100 parts of the polyester dispersion is added thereto, the pH is adjusted using sodium hydroxide, and the temperature is slowly increased to 55° C. Thereafter, the pH is adjusted to 8 by using an aqueous sodium hydroxide solution, the temperature is raised to 90° C., and the mixture is stirred for about 3 hours to coalesce the aggregated particles.

Subsequently, the mixture is slowly cooled, and at a temperature of 40° C., the pH is adjusted to 9 by using an aqueous sodium hydroxide solution. Then, the mixture is filtered and washed. The collected toner is subjected to a re-slurry process, washed with deionized water, adjusted to pH 5.0, and then stirred. Then, the toner is repeatedly washed with deionized water, washed until the conductivity of the washing liquid reaches 50 S/cm or less, and then dried.

In this way, white toner particles (W3) are obtained.

Preparation of White Toner Particles (W4)

White toner particles (W4) are obtained in the same manner as in the preparation of the white toner particles (W3), except that in the preparation of the white toner particles (W3), the pH after the re-slurry process of the toner collected after filtration and washing is changed to 4.5.

Preparation of White Toner Particles (W5)

White toner particles (W5) are obtained in the same manner as in the preparation of the white toner particles (W1), except that the amount of titanium oxide is changed to 45 parts.

Preparation of White Toner Particles (W6)

Toner particles are obtained in the same manner as in the preparation of white toner particles (W1), except that the particle size is changed.

Then, 50 parts of the obtained toner particles are added to an aqueous solvent prepared by adding 20.0 parts of an anionic surfactant (DKS Co. Ltd., NEOGEN RK) to 1,000 parts of deionized water, and the mixture is thoroughly stirred. Thereafter, while being stirred, the mixture is treated for 5 hours by heating at 75° C. After being cooled, the mixture is filtered and dispersed again in deionized water, and the pH is adjusted to 4.5 by using nitric acid, followed by stirring. Subsequently, the mixture is repeatedly washed with deionized water, washed until the washing liquid reaches 50 S/cm, and filtered and dried, thereby obtaining white toner particles (W6).

Preparation of White Toner Particles (W7)

White toner particles (W7) are obtained in the same manner as in the preparation of the white toner particles (W3), except that the aggregation temperature is changed to 43° C.

Preparation of White Toner Particles (W8)

White toner particles (W8) are obtained in the same manner as in the preparation of the white toner particles (W7), except that in the preparation of the white toner particles (W7), the pH after the re-slurry process of the toner collected after filtration and washing is changed to 4.0.

Preparation of White Toner Particles (W9)

White toner particles (W9) are obtained in the same manner as in the preparation of the white toner particles (W7), except that in the preparation of the white toner particles (W7), the pH after the re-slurry process of the toner collected after filtration and washing is changed to 4.8.

Preparation of White Toner Particles (W10)

White toner particles (W10) are obtained in the same manner as in the preparation of the white toner particles (W3), except that in the preparation of the white toner particles (W3), the pH after the re-slurry process of the toner collected after filtration and washing is changed to 4.0.

Preparation of White Toner Particles (W11) to (W14)

White toner particles (W11) to (W14) are obtained in the same manner as in the preparation of the white toner particles (W1), except that the pulverization conditions and the like are changed.

Preparation of White Toner Particles (W15)

White toner particles (W15) are obtained in the same manner as in the preparation of the white toner particles (W3), except that the washing conditions and the like are changed.

Preparation of White Toner

Hydrophobic silica (1.5 parts by mass, manufactured by Nippon Aerosil Co., Ltd., RY50), 1.0 part by mass of hydrophobic titanium oxide (manufactured by Nippon Aerosil Co., Ltd., T805), and zinc stearate particles (manufactured by NOF Corporation, NISSAN ELECTOL MZ-2) in the amount added to the exterior of toner particles described in Table 1 are mixed and blended with 100 parts by mass of each of the obtained white toner particles at 10,000 rpm for 30 seconds by using a sample mill. Then, the mixture is sieved with a vibration sieve having an opening size of 45 thereby preparing white toners W1 to W19 having the respective physical properties described in Table 1.

TABLE 1

| White toner | | | | | | | | |
|---|---|---|---|---|---|---|---|---|
| | | Amount of cation | BET specific surface area | Particle size | Small-particle-size component | | Amount of ZnSt added to exterior of toner particles | |
| No. | White toner particle No. | Cw mg/L | Bw $m^2/g$ | Dw μm | Sw pop % | SFw — | Zw wt % | Manufacturing method |
| W1 | (W1) | 0.2 | 1.1 | 7.5 | 24.5 | 0.958 | 0.09 | Kneading and pulverizing |
| W1-1 | (W1-1) | 0.21 | 1.1 | 7.5 | 20.1 | 0.959 | 0.09 | Kneading and pulverizing |
| W2 | (W2) | 0.4 | 1.1 | 7.5 | 28 | 0.956 | 0.09 | Kneading and pulverizing |
| W3 | (W3) | 0.52 | 1.1 | 7.5 | 9.8 | 0.965 | 0.09 | Aggregation and coalescence |
| W4 | (W4) | 0.2 | 1.1 | 7.5 | 10.2 | 0.968 | 0.09 | Aggregation and coalescence |
| W5 | (W5) | 0.21 | 1.1 | 7.5 | 28.1 | 0.962 | 0.09 | Kneading and pulverizing |
| W6 | (W6) | 0.1 | 1.2 | 6.5 | 28.1 | 0.962 | 0.09 | Kneading and pulverizing |
| W7 | (W7) | 0.4 | 1.2 | 6.5 | 15.3 | 0.963 | 0.09 | Aggregation and coalescence |
| W8 | (W8) | 0.08 | 1.2 | 6.5 | 18.6 | 0.964 | 0.09 | Aggregation and coalescence |
| W9 | (W9) | 0.41 | 1.2 | 6.5 | 12.4 | 0.96 | 0.09 | Aggregation and coalescence |
| W10 | (W10) | 0.38 | 1.1 | 7.5 | 8.5 | 0.963 | 0.09 | Aggregation and coalescence |
| W11 | (W1) | 0.2 | 1.1 | 7.5 | 24.5 | 0.958 | 0.06 | Kneading and pulverizing |
| W12 | (W1) | 0.2 | 1.1 | 7.5 | 24.5 | 0.958 | 0.16 | Kneading and pulverizing |
| W13 | (W1) | 0.2 | 1.1 | 7.5 | 24.5 | 0.958 | 0.05 | Kneading and pulverizing |
| W14 | (W1) | 0.2 | 1.1 | 7.5 | 24.5 | 0.958 | 0.17 | Kneading and pulverizing |
| W15 | (W11) | 0.13 | 0.72 | 8.2 | 18.6 | 0.962 | 0.09 | Kneading and pulverizing |
| W16 | (W12) | 0.42 | 1.19 | 5.9 | 26.3 | 0.954 | 0.09 | Kneading and pulverizing |
| W17 | (W13) | 0.13 | 0.69 | 8.3 | 10.5 | 0.966 | 0.09 | Kneading and pulverizing |
| W18 | (W14) | 0.43 | 1.21 | 5.8 | 28.5 | 0.965 | 0.09 | Kneading and pulverizing |
| W19 | (W15) | 0.13 | 1.35 | 7.5 | 10.5 | 0.962 | 0.09 | Aggregation and coalescence |

Preparation of Color Toner Particles (C1)

Preparation of Cyan Colorant Particle Dispersion

C. I. Pigment Blue 15:3 (phthalocyanine-based pigment, manufactured by Dainichiseika Color & Chemicals Mfg. Co., Ltd., cyanine blue 4937): 50 parts Ionic surfactant (manufactured by DKS Co. Ltd., NEOGEN RK): 5 parts Deionized water: 192.9 parts The above components are mixed together and treated with ULTIMIZER (manufactured by SUGINO MACHINE LIMITED) at 240 MPa for 10 minutes, thereby preparing a cyan colorant particle dispersion (1) having a concentration of solid content of 20%.

Preparation of Color Toner Particles

Amorphous polyester resin (A) dispersion (concentration of solid content 25%): 400 parts Crystalline polyester resin (C) dispersion (concentration of solid content 25%): 40 parts Cyan colorant particle dispersion (concentration of solid content 25%): 40 parts Release agent particle dispersion (concentration of solid content 25%): 40 parts The above raw materials are mixed together in a stainless steel flask and stirred for 30 minutes. Then, 75 parts of a 10% aqueous aluminum sulfate solution is added dropwise thereto, followed by mixing and dispersion by a homogenizer. Then, the mixture is heated to 45° C. under stirring, and kept at 45° C. for 30 minutes. Then, 100 parts of the polyester dispersion is added thereto, the pH is adjusted using sodium hydroxide, and the temperature is slowly increased to 55° C. Thereafter, the pH is adjusted to 8 by using an aqueous sodium hydroxide solution, the temperature is raised to 90° C., and the mixture is stirred for about 3 hours to coalesce the aggregated particles.

Subsequently, the mixture is slowly cooled, and at a temperature of 40° C., the pH is adjusted to 9 by using an aqueous sodium hydroxide solution. Then, the mixture is filtered and washed. The collected toner is subjected to a re-slurry process, washed with deionized water, adjusted to pH 5, and then stirred. Then, the toner is repeatedly washed with deionized water, washed until the conductivity of the washing liquid reaches 100 to 150 (μS/cm) or less, and then dried.

In this way, color toner particles (C1) are obtained.

Preparation of Color Toner Particles (C2) to (C13)

Color toner particles (C2) to (C13) are obtained by appropriately combining the preparation of the color toner particles (C1), control of the amount of the cation on the surface by the washing conditions, control of the particle size by the aggregation temperature, and the like.

Preparation of Color Toner

Hydrophobic silica (1.5 parts by mass, manufactured by Nippon Aerosil Co., Ltd., RY50), 1.0 part by mass of hydrophobic titanium oxide (manufactured by Nippon Aerosil Co., Ltd., T805), and zinc stearate particles (manufactured by NOF Corporation, NISSAN ELECTOL MZ-2) in the amount added to the exterior of toner particles described in Table 2 are mixed and blended with 100 parts by mass of each of the obtained color toner particles at 10,000 rpm for 30 seconds by using a sample mill. Then, the mixture is sieved with a vibration sieve having an opening size of 45 thereby preparing color toners C1 to C17 having the respective physical properties described in Table 2.

TABLE 2

| Color toner | | | | | | | | |
|---|---|---|---|---|---|---|---|---|
| | | Amount of cation | BET specific surface area | Particle size | Small-particle-size component | | Amount of ZnSt added to exterior of toner particles | |
| No. | Color toner particle No. | Cc mg/L | Bc $m^2/g$ | Dc μm | Sc pop % | SFc — | Zc wt % | Manufacturing method |
| C1 | (C1) | 0.51 | 1.07 | 6.2 | 4.6 | 0.965 | 0.30 | Aggregation and coalescence |
| C2 | (C2) | 0.62 | 1.07 | 6.2 | 10.6 | 0.968 | 0.30 | Aggregation and coalescence |
| C3 | (C3) | 0.31 | 1.07 | 6.2 | 2.4 | 0.973 | 0.30 | Aggregation and coalescence |
| C4 | (C4) | 1.2 | 1.07 | 6.2 | 4.4 | 0.966 | 0.30 | Aggregation and coalescence |
| C5 | (C5) | 0.29 | 1.07 | 6.2 | 1.8 | 0.97 | 0.30 | Aggregation and coalescence |
| C6 | (C6) | 1.21 | 1.07 | 6.2 | 3.8 | 0.97 | 0.30 | Aggregation and coalescence |
| C7 | (C7) | 0.72 | 1.07 | 6.2 | 3.2 | 0.968 | 0.30 | Aggregation and coalescence |
| C8 | (C1) | 0.51 | 1.07 | 6.2 | 4.6 | 0.965 | 0.22 | Aggregation and coalescence |
| C9 | (C1) | 0.51 | 1.07 | 6.2 | 4.6 | 0.965 | 0.42 | Aggregation and coalescence |
| C10 | (C1) | 0.51 | 1.07 | 6.2 | 4.6 | 0.965 | 0.20 | Aggregation and coalescence |
| C11 | (C1) | 0.51 | 1.07 | 6.2 | 4.6 | 0.965 | 0.45 | Aggregation and coalescence |
| C12 | (C8) | 0.51 | 1.02 | 6.7 | 1.5 | 0.969 | 0.30 | Aggregation and coalescence |
| C13 | (C9) | 0.51 | 1.28 | 4.8 | 8.6 | 0.966 | 0.30 | Aggregation and coalescence |
| C14 | (C10) | 0.51 | 0.98 | 6.7 | 3.6 | 0.968 | 0.30 | Aggregation and coalescence |

TABLE 2-continued

| Color toner | | | | | | | | |
|---|---|---|---|---|---|---|---|---|
| | | Amount of cation | BET specific surface area | Particle size | Small-particle-size component | | Amount of ZnSt added to exterior of toner particles | |
| No. | Color toner particle No. | Cc mg/L | Bc $m^2/g$ | Dc µm | Sc pop % | SFc — | Zc wt % | Manufacturing method |
| C15 | (C11) | 0.51 | 1.3 | 4.6 | 7.5 | 0.966 | 0.30 | Aggregation and coalescence |
| C16 | (C12) | 0.51 | 1.27 | 4.5 | 12.6 | 0.979 | 0.30 | Aggregation and coalescence |
| C17 | (C13) | 0.51 | 1.07 | 6.6 | 2.3 | 0.96 | 0.30 | Aggregation and coalescence |

Preparation of Electrostatic Charge Image Developer

Each of the obtained toners (8 parts) and 92 parts of the following carrier are mixed together by using a V blender, thereby preparing an electrostatic charge image developer.

Preparation of Carrier

Ferrite particles (average particle size 35 nm): 100 parts

Toluene: 14 parts

Polymethylmethacrylate (MMA, weight-average molecular weight 75,000): 5 parts

Carbon black: except for 0.2 parts of (VXC-72, manufactured by Cabot Corporation, volume resistivity: 100 Ω cm or less) ferrite particles, the above materials are dispersed with a sand mill, thereby preparing a dispersion. The dispersion is put in a vacuum deaeration-type kneader together with the ferrite particles, and dried under reduced pressure while being stirred, thereby obtaining a carrier.

Examples 1 to 31 and Comparative Examples 1 to 3

The developer containing a white toner and the developer containing a color toner, which are obtained as above, are combined as described in Tables 3 and 4 to prepare a developer set, and the following evaluation is performed.

"Irridesse" manufactured by FUJIFILM Business Innovation Corp. is prepared, and a developing device of Irridesse is filled with the developer containing a white toner and the developer containing a color toner that are combined as described in Tables 3 and 4.

In an environment at 30° C. and 85% RH, on a 10 kpv transparent film (transparent PET film for laser printer manufactured by Dynic Corporation, OZK 188 µm), a white image that is 20 mm wide in the transport direction of recording paper and has an image density of 100% is printed, and a cyan image having an image density of 100% is printed on the white image. The film is left to stand overnight (17 hours). Then, on 10 sheets of black paper (manufactured by Hokuetsu Corporation, high-quality black paper, 124 gsm), a white image that is 20 mm wide in the transport direction of recording paper and has an image density of 100% is printed, and a cyan image having an image density of 100% is printed on the white image.

The images formed on 10 sheets of black paper are observed to check the presence or absence of white streaks and the size of the white streaks, and evaluated according to the following criteria. A is the highest evaluation level, and F is the lowest evaluation level. Furthermore, A to D are levels having no problem in actual use.

Criteria

A: No white streak occurs.

B: A thin white streak having a length less than 1 cm is found by close observation, and the number of streaks is 1.

C: Thin white streaks having a length less than 1 cm are found by close observation, and the number of streaks is 2.

D: A white streak having a length of 1 cm or more is found by close observation, and the number of streaks is 1.

E: Thick white streaks having a length less than 1 cm occur.

F: Thick white streaks having a length of 1 cm or more occur.

The above evaluation results are shown in Tables 3 and 4.

Tables 3 and 4 show the respective conditions in combination. In the columns of the respective conditions, "O" means that the condition is satisfied, and "X" means that the conditions are not satisfied.

TABLE 3

| | | | Condition (1) | | Condition (2) | | Condition (2*) | | Condition (3) | | Condition (4) Cw/Bw < Cc/Bc | | | Condition (5) |
|---|---|---|---|---|---|---|---|---|---|---|---|---|---|---|
| | White | Color | Cc | | Cw/Cc | | Cw/Cc | | Cw | | Cw/Bw | Cc/Bc | | Cw/Dw |
| | toner | toner | mg/L | | — | | — | | mg/L | | — | — | | — |
| Example 1 | W1 | C1 | 0.51 | ○ | 0.39 | ○ | 0.39 | ○ | 0.2 | ○ | 0.18 | 0.48 | ○ | 0.03 |
| Example 2 | W1-1 | C1 | 0.51 | ○ | 0.41 | ○ | 0.41 | ○ | 0.2 | ○ | 0.19 | 0.48 | ○ | 0.03 |
| Example 3 | W2 | C1 | 0.51 | ○ | 0.78 | ○ | 0.78 | ○ | 0.4 | ○ | 0.36 | 0.48 | ○ | 0.05 |
| Comparative Example 1 | W3 | C2 | 0.62 | ○ | 0.84 | X | 0.84 | X | 0.52 | ○ | 0.47 | 0.58 | ○ | 0.07 |
| Example 4 | W1 | C3 | 0.31 | ○ | 0.65 | ○ | 0.65 | ○ | 0.2 | ○ | 0.18 | 0.29 | ○ | 0.03 |
| Example 5 | W1 | C4 | 1.2 | ○ | 0.17 | ○ | 0.17 | X | 0.2 | ○ | 0.18 | 1.12 | ○ | 0.03 |

TABLE 3-continued

| | | | | | | | | | | | | | | |
|---|---|---|---|---|---|---|---|---|---|---|---|---|---|---|
| Comparative Example 2 | W4 | C5 | 0.29 | X | 0.69 | ○ | 0.69 | ○ | 0.2 | ○ | 0.18 | 0.27 | ○ | 0.03 |
| Comparative Example 3 | W4 | C6 | 1.21 | X | 0.17 | ○ | 0.17 | X | 0.2 | ○ | 0.18 | 1.13 | ○ | 0.03 |
| Example 6 | W5 | C2 | 0.62 | ○ | 0.34 | ○ | 0.34 | ○ | 0.2 | ○ | 0.19 | 0.58 | ○ | 0.03 |
| Example 7 | W5 | C7 | 0.72 | ○ | 0.29 | ○ | 0.29 | X | 0.2 | ○ | 0.19 | 0.67 | ○ | 0.03 |
| Example 8 | W6 | C1 | 0.51 | ○ | 0.20 | ○ | 0.20 | X | 0.1 | ○ | 0.08 | 0.48 | ○ | 0.02 |
| Example 9 | W7 | C1 | 0.51 | ○ | 0.78 | ○ | 0.78 | ○ | 0.6 | ○ | 0.33 | 0.48 | ○ | 0.06 |
| Example 10 | W8 | C1 | 0.51 | ○ | 0.16 | ○ | 0.16 | X | 0.08 | X | 0.07 | 0.48 | ○ | 0.01 |
| Example 11 | W9 | C1 | 0.51 | ○ | 0.80 | ○ | 0.80 | ○ | 0.62 | X | 0.34 | 0.48 | ○ | 0.06 |
| Example 12 | W10 | C1 | 0.51 | ○ | 0.75 | ○ | 0.75 | ○ | 0.38 | ○ | 0.35 | 0.48 | ○ | 0.05 |
| Example 13 | W5 | C1 | 0.51 | ○ | 0.41 | ○ | 0.41 | ○ | 0.2 | ○ | 0.19 | 0.48 | ○ | 0.03 |

| | Condition (5) | Condition (6) Zw/Bw | | Condition (7) Bw | | Condition (8) Zc/Bc | | Condition (9) Bc | | Condition (10) Sw > Sc (Sw − Sc) | | Condition (11) SFw < SFc (SFc − SFw) | | Evaluation White |
|---|---|---|---|---|---|---|---|---|---|---|---|---|---|---|
| | Cw/Dw | — | | $m^2/g$ | | — | | $m^2/g$ | | pop % | | — | | streaks |
| Example 1 | ○ | 0.082 | ○ | 1.1 | ○ | 0.28 | ○ | 1.07 | ○ | 19.9 | ○ | 0.007 | ○ | A |
| Example 2 | ○ | 0.082 | ○ | 1.1 | ○ | 0.28 | ○ | 1.07 | ○ | 15.5 | ○ | 0.006 | ○ | A |
| Example 3 | ○ | 0.082 | ○ | 1.1 | ○ | 0.28 | ○ | 1.07 | ○ | 23.4 | ○ | 0.009 | ○ | D |
| Comparative Example 1 | X | 0.082 | ○ | 1.1 | ○ | 0.28 | ○ | 1.07 | ○ | −0.8 | X | 0.003 | ○ | F |
| Example 4 | ○ | 0.082 | ○ | 1.1 | ○ | 0.28 | ○ | 1.07 | ○ | 22.1 | ○ | 0.015 | ○ | D |
| Example 5 | ○ | 0.082 | ○ | 1.1 | ○ | 0.28 | ○ | 1.07 | ○ | 20.1 | ○ | 0.008 | ○ | C |
| Comparative Example 2 | ○ | 0.082 | ○ | 1.1 | ○ | 0.28 | ○ | 1.07 | ○ | 8.4 | ○ | 0.002 | ○ | E |
| Comparative Example 3 | ○ | 0.082 | ○ | 1.1 | ○ | 0.28 | ○ | 1.07 | ○ | 6.4 | ○ | 0.002 | ○ | F |
| Example 6 | ○ | 0.082 | ○ | 1.1 | ○ | 0.28 | ○ | 1.07 | ○ | 17.5 | ○ | 0.006 | ○ | B |
| Example 7 | ○ | 0.082 | ○ | 1.1 | ○ | 0.28 | ○ | 1.07 | ○ | 24.9 | ○ | 0.006 | ○ | C |
| Example 8 | ○ | 0.075 | ○ | 1.2 | ○ | 0.28 | ○ | 1.07 | ○ | 23.5 | ○ | 0.003 | ○ | B |
| Example 9 | X | 0.075 | X | 1.2 | ○ | 0.28 | ○ | 1.07 | ○ | 10.7 | ○ | 0.002 | ○ | C |
| Example 10 | ○ | 0.075 | ○ | 1.2 | ○ | 0.28 | ○ | 1.07 | ○ | 14 | ○ | 0.001 | ○ | C |
| Example 11 | X | 0.075 | X | 1.2 | ○ | 0.28 | ○ | 1.07 | ○ | 7.8 | ○ | 0.005 | ○ | D |
| Example 12 | ○ | 0.082 | ○ | 1.1 | ○ | 0.28 | ○ | 1.07 | ○ | 3.9 | ○ | 0.002 | ○ | B |
| Example 13 | ○ | 0.082 | ○ | 1.1 | ○ | 0.28 | ○ | 1.07 | ○ | 23.5 | ○ | 0.003 | ○ | C |

TABLE 4

| | | | Condition (1) | | Condition (2) | | Condition (2*) | | Condition (3) | | Condition (4) Cw/Bw < Cc/Bc | | | Condition (5) |
|---|---|---|---|---|---|---|---|---|---|---|---|---|---|---|
| | White | Color | Cc | | Cw/Cc | | Cw/Cc | | Cw | | Cw/Bw | Cc/Bc | | Cw/Dw |
| | toner | toner | mg/L | | — | | — | | mg/L | | — | — | | — |
| Example 14 | W11 | C1 | 0.51 | ○ | 0.39 | ○ | 0.39 | ○ | 0.2 | ○ | 0.18 | 0.48 | ○ | 0.03 |
| Example 15 | W12 | C1 | 0.51 | ○ | 0.39 | ○ | 0.39 | ○ | 0.2 | ○ | 0.18 | 0.48 | ○ | 0.03 |
| Example 16 | W13 | C1 | 0.51 | ○ | 0.39 | ○ | 0.39 | ○ | 0.2 | ○ | 0.18 | 0.48 | ○ | 0.03 |
| Example 17 | W14 | C1 | 0.51 | ○ | 0.39 | ○ | 0.39 | ○ | 0.2 | ○ | 0.18 | 0.48 | ○ | 0.03 |
| Example 18 | W15 | C2 | 0.62 | ○ | 0.21 | ○ | 0.21 | X | 0.13 | ○ | 0.18 | 0.58 | ○ | 0.02 |
| Example 19 | W16 | C2 | 0.62 | ○ | 0.68 | ○ | 0.68 | ○ | 0.42 | ○ | 0.35 | 0.58 | ○ | 0.07 |
| Example 20 | W17 | C2 | 0.62 | ○ | 0.21 | ○ | 0.21 | X | 0.13 | ○ | 0.19 | 0.58 | ○ | 0.02 |
| Example 21 | W18 | C2 | 0.62 | ○ | 0.69 | ○ | 0.69 | ○ | 0.43 | ○ | 0.36 | 0.58 | ○ | 0.07 |
| Example 22 | W1 | C8 | 0.51 | ○ | 0.39 | ○ | 0.39 | ○ | 0.2 | ○ | 0.18 | 0.48 | ○ | 0.03 |
| Example 23 | W1 | C9 | 0.51 | ○ | 0.39 | ○ | 0.39 | ○ | 0.2 | ○ | 0.18 | 0.48 | ○ | 0.03 |
| Example 24 | W1 | C10 | 0.51 | ○ | 0.39 | ○ | 0.39 | ○ | 0.2 | ○ | 0.18 | 0.48 | ○ | 0.03 |
| Example 25 | W1 | C11 | 0.51 | ○ | 0.39 | ○ | 0.39 | ○ | 0.2 | ○ | 0.18 | 0.48 | ○ | 0.03 |
| Example 26 | W19 | C12 | 0.51 | ○ | 0.25 | ○ | 0.25 | X | 0.13 | ○ | 0.10 | 0.50 | ○ | 0.02 |

TABLE 4-continued

| | | | | | | | | | | | | | | |
|---|---|---|---|---|---|---|---|---|---|---|---|---|---|---|
| Example 27 | W19 | C13 | 0.51 | ○ | 0.25 | ○ | 0.25 | X | 0.13 | ○ | 0.10 | 0.40 | ○ | 0.02 |
| Example 28 | W19 | C14 | 0.51 | ○ | 0.25 | ○ | 0.25 | X | 0.13 | ○ | 0.10 | 0.52 | ○ | 0.02 |
| Example 29 | W19 | C15 | 0.51 | ○ | 0.25 | ○ | 0.25 | X | 0.13 | ○ | 0.10 | 0.39 | ○ | 0.02 |
| Example 30 | W19 | C16 | 0.51 | ○ | 0.25 | ○ | 0.25 | X | 0.13 | ○ | 0.10 | 0.40 | ○ | 0.02 |
| Example 31 | W19 | C17 | 0.51 | ○ | 0.25 | ○ | 0.25 | X | 0.13 | ○ | 0.10 | 0.48 | ○ | 0.02 |

| | Condition (5) Cw/Dw | Condition (6) Zw/Bw | | Condition (7) Bw | | Condition (8) Zc/Bc | | Condition (9) Bc | | Condition (10) Sw > Sc (Sw − Sc) | | Condition (11) SFw < SFc (SFc − SFw) | | Evaluation White |
|---|---|---|---|---|---|---|---|---|---|---|---|---|---|---|
| | — | — | | m²/g | | — | | m²/g | | pop % | | — | | streaks |
| Example 14 | ○ | 0.055 | ○ | 1.1 | ○ | 0.28 | ○ | 1.07 | ○ | 19.9 | ○ | 0.007 | ○ | B |
| Example 15 | ○ | 0.145 | ○ | 1.1 | ○ | 0.28 | ○ | 1.07 | ○ | 19.9 | ○ | 0.007 | ○ | B |
| Example 16 | ○ | 0.045 | X | 1.1 | ○ | 0.28 | ○ | 1.07 | ○ | 19.9 | ○ | 0.007 | ○ | C |
| Example 17 | ○ | 0.135 | X | 1.1 | ○ | 0.28 | ○ | 1.07 | ○ | 19.9 | ○ | 0.007 | ○ | C |
| Example 18 | ○ | 0.125 | ○ | 0.72 | ○ | 0.28 | ○ | 1.07 | ○ | 8 | ○ | 0.006 | ○ | B |
| Example 19 | X | 0.076 | ○ | 1.19 | ○ | 0.28 | ○ | 1.07 | ○ | 15.7 | ○ | 0.014 | ○ | B |
| Example 20 | ○ | 0.130 | ○ | 0.69 | X | 0.28 | ○ | 1.07 | ○ | −0.1 | X | 0.002 | ○ | C |
| Example 21 | X | 0.074 | ○ | 1.21 | X | 0.28 | ○ | 1.07 | ○ | 17.9 | ○ | 0.003 | ○ | C |
| Example 22 | ○ | 0.082 | ○ | 1.1 | ○ | 0.21 | ○ | 1.07 | ○ | 19.9 | ○ | 0.007 | ○ | B |
| Example 23 | ○ | 0.082 | ○ | 1.1 | ○ | 0.39 | ○ | 1.07 | ○ | 19.9 | ○ | 0.007 | ○ | B |
| Example 24 | ○ | 0.082 | ○ | 1.1 | ○ | 0.19 | X | 1.07 | ○ | 19.9 | ○ | 0.007 | ○ | C |
| Example 25 | ○ | 0.082 | ○ | 1.1 | ○ | 0.42 | X | 1.07 | ○ | 19.9 | ○ | 0.007 | ○ | C |
| Example 26 | ○ | 0.067 | ○ | 1.35 | ○ | 0.294 | ○ | 1.02 | ○ | 9 | ○ | 0.007 | ○ | B |
| Example 27 | ○ | 0.067 | ○ | 1.35 | ○ | 0.234 | ○ | 1.28 | ○ | 1.9 | ○ | 0.004 | ○ | B |
| Example 28 | ○ | 0.067 | ○ | 1.35 | ○ | 0.306 | ○ | 0.98 | X | 6.9 | ○ | 0.006 | ○ | C |
| Example 29 | ○ | 0.067 | ○ | 1.35 | ○ | 0.231 | ○ | 1.3 | X | 3 | ○ | 0.004 | ○ | C |
| Example 30 | ○ | 0.067 | ○ | 1.35 | ○ | 0.236 | ○ | 1.27 | ○ | −2.1 | X | 0.017 | ○ | C |
| Example 31 | ○ | 0.067 | ○ | 1.35 | ○ | 0.280 | ○ | 1.07 | ○ | 8.2 | ○ | −0.002 | X | C |

The above results tell that the present example further suppresses the occurrence of white streaks compared to comparative examples.

Hereinafter, aspects of the present invention will be additionally described.

(((1))) A toner set comprising:

a white toner; and a color toner, wherein in a case where Cw [mg/L] represents an amount of a cation on a surface of the white toner, measured by ion chromatography, and Cc [mg/L] represents an amount of a cation on a surface of the color toner, measured by ion chromatography, the toner set satisfies Conditions (1) and (2), $$0.3\ \text{mg/L} \leq Cc \leq 1.2\ \text{mg/L} \quad (1)$$

$$(Cw/Cc) \leq 0.8. \quad (2)$$

(((2))) The toner set according to (((1))), wherein the toner set satisfies Condition (2'), $$0.3 \leq (Cw/Cc) \leq 0.8. \quad (2')$$

(((3))) The toner set according to (((1))) or (((2))), wherein the toner set satisfies Condition (3), $$0.1\ \text{mg/L} \leq Cw \leq 0.6\ \text{mg/L}. \quad (3)$$

(((4))) The toner set according to any one of (((1))) to (((3))), wherein in a case where Bw [m²/g] represents a BET specific surface area of the white toner, and Bc [m²/g] represents a BET specific surface area of the color toner, the toner set satisfies Condition (4), $$(Cw/Bw) < (Cc/Bc). \quad (4)$$

(((5))) The toner set according to any one of (((1))) to (((4))), wherein in a case where Dw [μm] represents a volume-average particle size of the white toner, the toner set satisfies Condition (5), $$(Cw/Dw)\leq 0.05. \quad (5)$$

(((6))) The toner set according to any one of (((1))) to (((5))), wherein the white toner contains white toner particles and zinc stearate particles as an external additive, and in a case where Zw [% by mass] represents an amount of the zinc stearate particles added to an exterior of the white toner particles, and Bw [$m^2/g$] represents a BET specific surface area of the white toner, the toner set satisfies Condition (6), $$0.05\leq(Zw/Bw)\leq 0.15. \quad (6)$$

(((7))) The toner set according to any one of (((1))) to (((6))), wherein the toner set satisfies Condition (7), $$0.7\ m^2/g\leq Bw\leq 1.2\ m^2/g. \quad (7)$$

(((8))) The toner set according to any one of (((1))) to (((7))), wherein the color toner contains color toner particles and zinc stearate particles as an external additive, and in a case where Zc [% by mass] represents an amount of the zinc stearate particles added to an exterior of the color toner particles, and Bc [$m^2/g$] represents a BET specific surface area of the color toner, the toner set satisfies Condition (8), $$0.20\leq(Zc/Bc)\leq 0.40. \quad (8)$$

(((9))) The toner set according to any one of (((1))) to (((8))), wherein the toner set satisfies Condition (9), $$1.0\ m^2/g\leq Bc\leq 1.3\ m^2/g. \quad (9)$$

(((10))) The toner set according to any one of (((1))) to (((9))), wherein in a case where Sw [pop %] represents an amount of a small-particle-size component having a particle size of 3 μm or less in the white toner, Sc [pop %] represents an amount of a small-particle-size component having a particle size of 3 μm or less in the color toner, SFw represents a circularity of the small-particle-size component in the white toner, and SFc represents a circularity of the small-particle-size component in the color toner, the toner set satisfies Conditions (10) and (11), $$Sw>Sc \quad (10)$$

$$SFw<SFc. \quad (11)$$

(((11))) The toner set according to any one of (((1))) to (((10))), wherein the cation is one or more kinds of cations selected from an alkali metal and an alkaline earth metal.

(((12))) The toner set according to any one of (((1))) to (((11))), wherein the cation is a sodium ion.

(((13))) An electrostatic charge image developer set comprising:

a first electrostatic charge image developer containing the white toner in the toner set according to any one of (((1))) to (((12))); and a second electrostatic charge image developer containing the color toner in the toner set according to any one of (((1))) to (((12))).

(((14))) A toner cartridge set comprising:

a first toner cartridge that has a container containing the white toner in the toner set according to any one of (((1))) to (((12))); and a second toner cartridge that has a container containing the color toner in the toner set according to any one of (((1))) to (((12))), wherein the toner cartridge set is detachable from an image forming apparatus.

(((15))) A process cartridge comprising:

a first developing unit that contains the first electrostatic charge image developer in the electrostatic charge image developer set according to (((13))); and a second developing unit that contains the second electrostatic charge image developer in the electrostatic charge image developer set according to (((13))), wherein the process cartridge is detachable from an image forming apparatus.

(((16))) An image forming apparatus comprising:

a first image forming unit that forms a first image by the white toner in the toner set according to any one of (((1))) to (((12)));

a second image forming unit that forms a second image by the color toner in the toner set according to any one of (((1))) to (((12)));

an intermediate transfer member to which the first image and the second image are transferred;

a primary transfer unit that transfers the first image and the second image to a surface of the intermediate transfer member;

a secondary transfer unit that transfers the first image and the second image transferred to the surface of the intermediate transfer member to a surface of a recording medium;

an intermediate transfer member-cleaning unit that has a blade coming into contact with the surface of the intermediate transfer member and cleans the surface of the intermediate transfer member by the blade; and a fixing unit that fixes the first image and the second image to the surface of the recording medium.

(((17))) An image forming method comprising:

forming a first image by using the white toner in the toner set according to any one of (((1))) to (((12)));

forming a second image by using the color toner in the toner set according to any one of (((1))) to (((12)));

transferring the first image and the second image to a surface of an intermediate transfer member;

transferring the first image and the second image transferred to the surface of the intermediate transfer member to a surface of a recording medium;

cleaning a surface of the intermediate transfer member after the first image and the second image are transferred to the surface of the recording medium, by using a blade brought into contact with the surface of the intermediate transfer member; and fixing the first image and the second image to the surface of the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A toner set comprising:

a white toner; and a color toner, wherein in a case where Cw [mg/L] represents an amount of a cation on a surface of the white toner, measured by ion chromatography, and Cc [mg/L] represents an amount of a cation on a surface of the color toner, measured by ion chromatography, the toner set satisfies Conditions (1) and (2'), $$0.3\ \text{mg/L} \leq Cc \leq 1.2\ \text{mg/L} \quad (1)$$

$$0.3 \leq (Cw/Cc) \leq 0.8. \quad (2')$$

2. The toner set according to claim 1, wherein the toner set satisfies Condition (3), $$0.1\ \text{mg/L} \leq Cw \leq 0.6\ \text{mg/L}. \quad (3)$$

3. The toner set according to claim 1, wherein in a case where Bw [$m^2/g$] represents a BET specific surface area of the white toner, and Bc [$m^2/g$] represents a BET specific surface area of the color toner, the toner set satisfies Condition (4), $$(Cw/Bw) < (Cc/Bc). \quad (4)$$

4. The toner set according to claim 1, wherein in a case where Dw [μm] represents a volume-average particle size of the white toner, the toner set satisfies Condition (5), $$(Cw/Dw) \leq 0.05. \quad (5)$$

5. The toner set according to claim 1, wherein the white toner contains white toner particles and zinc stearate particles as an external additive, and in a case where Zw [% by mass] represents an amount of the zinc stearate particles added to an exterior of the white toner particles, and Bw [$m^2/g$] represents a BET specific surface area of the white toner, the toner set satisfies Condition (6), $$0.05 \leq (Zw/Bw) \leq 0.15. \quad (6)$$

6. The toner set according to claim 5, wherein the toner set satisfies Condition (7), $$0.7\ m^2/g \leq Bw \leq 1.2\ m^2/g. \quad (7)$$

7. The toner set according to claim 1, wherein the color toner contains color toner particles and zinc stearate particles as an external additive, and in a case where Zc [% by mass] represents an amount of the zinc stearate particles added to an exterior of the color toner particles, and Bc [$m^2/g$] represents a BET specific surface area of the color toner, the toner set satisfies Condition (8), $$0.20 \leq (Zc/Bc) \leq 0.40. \quad (8)$$

8. The toner set according to claim 7, wherein the toner set satisfies Condition (9), $$1.0\ m^2/g \leq Bc \leq 1.3\ m^2/g. \quad (9)$$

9. The toner set according to claim 1, wherein in a case where Sw [pop %] represents an amount of a small-particle-size component having a particle size of 3 μm or less in the white toner, Sc [pop %] represents an amount of a small-particle-size component having a particle size of 3 μm or less in the color toner, SFw represents a circularity of the small-particle-size component in the white toner, and SFc represents a circularity of the small-particle-size component in the color toner, the toner set satisfies Conditions (10) and (11), $$Sw > Sc \quad (10)$$

$$SFw < SFc. \quad (11)$$

10. The toner set according to claim 1, wherein the cation on the surface of the white toner and the cation on the surface of the color toner, respectively is one or more kinds of cations selected from an alkali metal and an alkaline earth metal.

11. The toner set according to claim 1, wherein the cation on the surface of the white toner and the cation on the surface of the color toner, respectively is a sodium ion.

12. An electrostatic charge image developer set comprising:

a first electrostatic charge image developer containing the white toner in the toner set according to claim 1; and a second electrostatic charge image developer containing the color toner in the toner set according to claim 1.

13. An electrostatic charge image developer set comprising:

a first electrostatic charge image developer containing the white toner in the toner set according to claim 2; and a second electrostatic charge image developer containing the color toner in the toner set according to claim 2.

14. An electrostatic charge image developer set comprising:

a first electrostatic charge image developer containing the white toner in the toner set according to claim 3; and a second electrostatic charge image developer containing the color toner in the toner set according to claim 3.

15. A toner cartridge set comprising:

a first toner cartridge that has a container containing the white toner in the toner set according to claim 1; and a second toner cartridge that has a container containing the color toner in the toner set according to claim 1, wherein the toner cartridge set is detachable from an image forming apparatus.

16. A process cartridge comprising:

a first developing unit that contains the first electrostatic charge image developer in the electrostatic charge image developer set according to claim 12; and a second developing unit that contains the second electrostatic charge image developer in the electrostatic charge image developer set according to claim 12, wherein the process cartridge is detachable from an image forming apparatus.

17. An image forming apparatus comprising:

a first image forming unit that forms a first image by the white toner in the toner set according to claim 1;

a second image forming unit that forms a second image by the color toner in the toner set according to claim 1;

an intermediate transfer member to which the first image and the second image are transferred;

a primary transfer unit that transfers the first image and the second image to a surface of the intermediate transfer member;

a secondary transfer unit that transfers the first image and the second image transferred to the surface of the intermediate transfer member to a surface of a recording medium;

an intermediate transfer member-cleaning unit that has a blade coming into contact with the surface of the intermediate transfer member and cleans the surface of the intermediate transfer member by the blade; and a fixing unit that fixes the first image and the second image to the surface of the recording medium.

* * * * *